(12) United States Patent
Toyama

(10) Patent No.: US 11,366,256 B2
(45) Date of Patent: Jun. 21, 2022

(54) DIFFRACTIVE OPTICAL ELEMENT

(71) Applicant: DAI NIPPON PRINTING CO., LTD., Tokyo (JP)

(72) Inventor: Nobuhito Toyama, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 80 days.

(21) Appl. No.: 16/493,110

(22) PCT Filed: Mar. 19, 2018

(86) PCT No.: PCT/JP2018/010729
§ 371 (c)(1),
(2) Date: Sep. 11, 2019

(87) PCT Pub. No.: WO2018/169093
PCT Pub. Date: Sep. 20, 2018

(65) Prior Publication Data
US 2020/0116908 A1  Apr. 16, 2020

(30) Foreign Application Priority Data

Mar. 17, 2017 (JP) .............................. JP2017-053473
Oct. 31, 2017 (JP) .............................. JP2017-210170
Mar. 15, 2018 (JP) .............................. JP2018-047875

(51) Int. Cl.
*G02B 5/18* (2006.01)

(52) U.S. Cl.
CPC .................................. *G02B 5/1866* (2013.01)

(58) Field of Classification Search
CPC .. G02B 5/1861; G02B 5/1866; G02B 5/1871; G02B 5/1876; G02B 2005/1804; B42D 25/324; B42D 25/328
See application file for complete search history.

(56) References Cited

U.S. PATENT DOCUMENTS 3,045,532 A * 7/1962 Staunton ............... G02B 5/1861
359/571
5,400,311 A * 3/1995 Komma ................. G02B 5/188
(Continued)

FOREIGN PATENT DOCUMENTS

CN       105403936 A      3/2016
JP       H09-230121 A     9/1997
(Continued)

OTHER PUBLICATIONS

Jun. 26, 2018 Search Report issued in International Patent Application No. PCT/JP2018/010729.
(Continued)

*Primary Examiner* — Kimberly N. Kakalec
(74) *Attorney, Agent, or Firm* — Oliff PLC

(57) ABSTRACT

A diffractive optical element capable of further reducing zero-order diffraction light includes a diffraction layer including: a high refractive index part in which a plurality of projections are arranged side by side in a cross-sectional shape; and a low refractive index part that has a lower refractive index than the high refractive index part and that includes a recess formed at least between the projections. The projections have a sawtooth shape or a shape that imitates a sawtooth shape by a multi-stage outline shape. An inclined plane that is inclined with respect to a sheet surface of the diffractive optical element, which has a sawtooth shape or a sawtooth shape imitated by a multi-stage outline shape, has a concave curved plane that is concave toward the projections.

10 Claims, 46 Drawing Sheets

(56) References Cited

U.S. PATENT DOCUMENTS

| | | | |
|---|---|---|---|
| 5,995,285 A * | 11/1999 | Unno | G02B 5/1857 |
| | | | 355/53 |
| 2007/0182915 A1 | 8/2007 | Osawa et al. | |
| 2011/0075546 A1* | 3/2011 | Mimori | G11B 7/1353 |
| | | | 369/112.23 |
| 2011/0085433 A1 | 4/2011 | Takada et al. | |
| 2013/0182327 A1 | 7/2013 | Miyasaka et al. | |
| 2016/0178358 A1 | 6/2016 | Miyasaka | |
| 2019/0178468 A1 | 6/2019 | Miyazaki et al. | |

FOREIGN PATENT DOCUMENTS

| | | |
|---|---|---|
| JP | 2006-188416 A | 7/2006 |
| JP | 2010-096999 A | 4/2010 |
| JP | 2010-102008 A | 5/2010 |
| JP | 2014-006950 A | 1/2014 |
| JP | 2017-211661 A | 11/2017 |
| JP | 2018-036633 A | 3/2018 |
| WO | 2006/043516 A1 | 4/2006 |
| WO | 2008/126562 A1 | 10/2008 |
| WO | 2009/154072 A1 | 12/2009 |
| WO | 2012/018017 A1 | 2/2012 |
| WO | 2015/030127 A1 | 3/2015 |
| WO | 2017/119400 A1 | 7/2017 |

OTHER PUBLICATIONS

Mar. 25, 2021 Office Action issued in Chinese Patent Application No. 201880018480.0.
Jan. 18, 2022 Office Action issued in Japanese Application No. 2018-047875.

\* cited by examiner

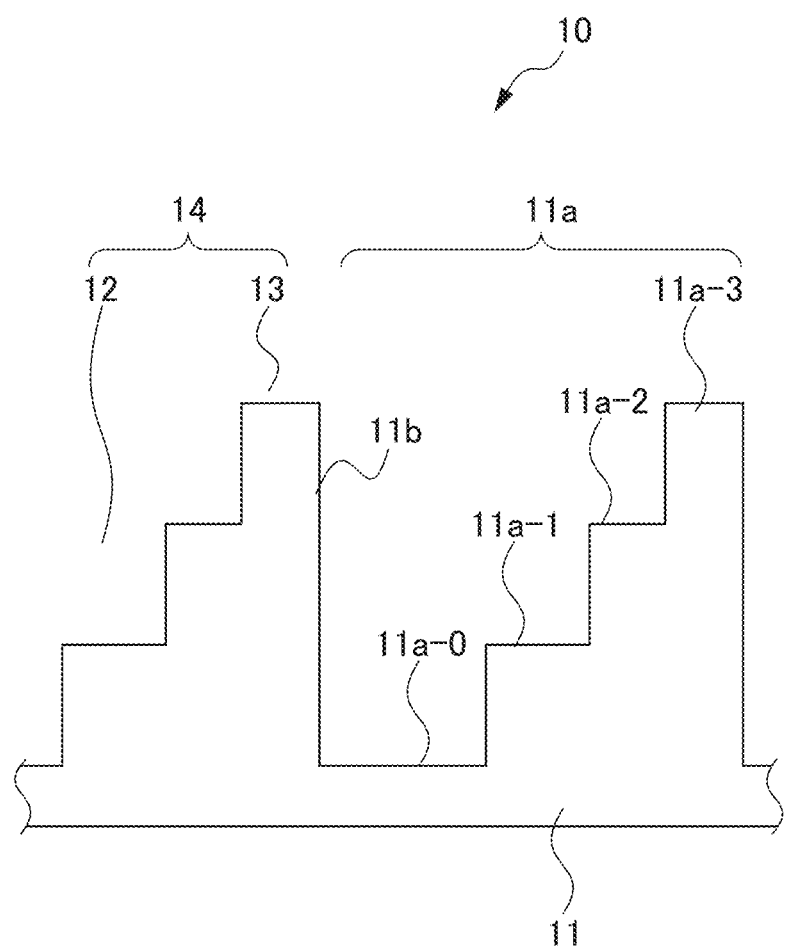

FIG. 15

| | CORRECTION OF HEIGHT | CORRECTION OF WIDTH | DIFFRACTION EFFICIENCY (%) | | | |
|---|---|---|---|---|---|---|
| | | | ZEROTH-ORDER DIFFRACTION LIGHT | | FIRST-ORDER DIFFRACTION LIGHT | |
| | | | PITCH OF 2 μm | PITCH OF 4 μm | PITCH OF 2 μm | PITCH OF 4 μm |
| Comparative Example 1 | NO | NO | 9.53 | 1.88 | 49.77 | 79.77 |
| Comparative Example 2 | 1.106 TIMES | NO | 6.79 | 0.81 | 43.23 | 75.96 |
| Example 1 | 1.106 TIMES | CURVED PLANE IMITATED BY SEQUENTIALLY INCREASING WIDTH (20%) IN DEEP PORTION | 0.54 | 0.87 | 38.43 | 71.01 |
| Example 2 | CURVED LINE IMITATED BY SEQUENTIALLY DECREASING HEIGHT (16%) IN DEEP PORTION (BASED ON COMPARATIVE EXAMPLE 2) | NO | 0.94 | 0.60 | 39.67 | 75.00 |

PITCH OF 3284 nm (DIFFRACTION ANGLE OF 15°)
f = -0.02, t = 0.8

| C | 0th(15°) |
|---|---|
| 0.15 | 0.036858 |
| 0.16 | 0.028533 |
| 0.17 | 0.02068 |
| 0.18 | 0.014222 |
| 0.19 | 0.00955 |
| 0.2 | 0.006413 |
| 0.21 | 0.004381 |
| 0.22 | 0.003092 |
| 0.23 | 0.002295 |
| 0.24 | 0.001826 |
| 0.25 | 0.001578 |
| 0.26 | 0.00148 |
| 0.27 | 0.001488 |
| 0.28 | 0.001568 |
| 0.29 | 0.0017 |
| 0.3 | 0.001866 |
| 0.31 | 0.002057 |
| 0.32 | 0.002263 |
| 0.4 | 0.004023 |
| 0.5 | 0.005851 |
| 0.7 | 0.008212 |
| 1 | 0.010096 |

PITCH OF 3284 nm
(DIFFRACTION ANGLE OF 15°)
f = −0.02, t = 0.8

| C | 0th(15°) |
|---|---|
| 0.09 | 0.016729 |
| 0.1 | 0.010976 |
| 0.11 | 0.007537 |
| 0.12 | 0.005444 |
| 0.13 | 0.004165 |
| 0.14 | 0.003395 |
| 0.15 | 0.002951 |
| 0.16 | 0.002718 |
| 0.17 | 0.002627 |
| 0.18 | 0.002629 |
| 0.19 | 0.002695 |
| 0.2 | 0.002803 |
| 0.21 | 0.002939 |
| 0.22 | 0.003092 |
| 0.23 | 0.003257 |
| 0.24 | 0.003427 |
| 0.25 | 0.0036 |
| 0.26 | 0.003773 |
| 0.27 | 0.003944 |
| 0.28 | 0.004112 |
| 0.29 | 0.004277 |
| 0.3 | 0.004437 |
| 0.31 | 0.004593 |
| 0.32 | 0.004744 |
| 0.33 | 0.00489 |
| 0.34 | 0.005031 |
| 0.4 | 0.005782 |
| 0.5 | 0.006733 |
| 0.7 | 0.007936 |
| 1 | 0.008914 |
| 1.2 | 0.00931 |

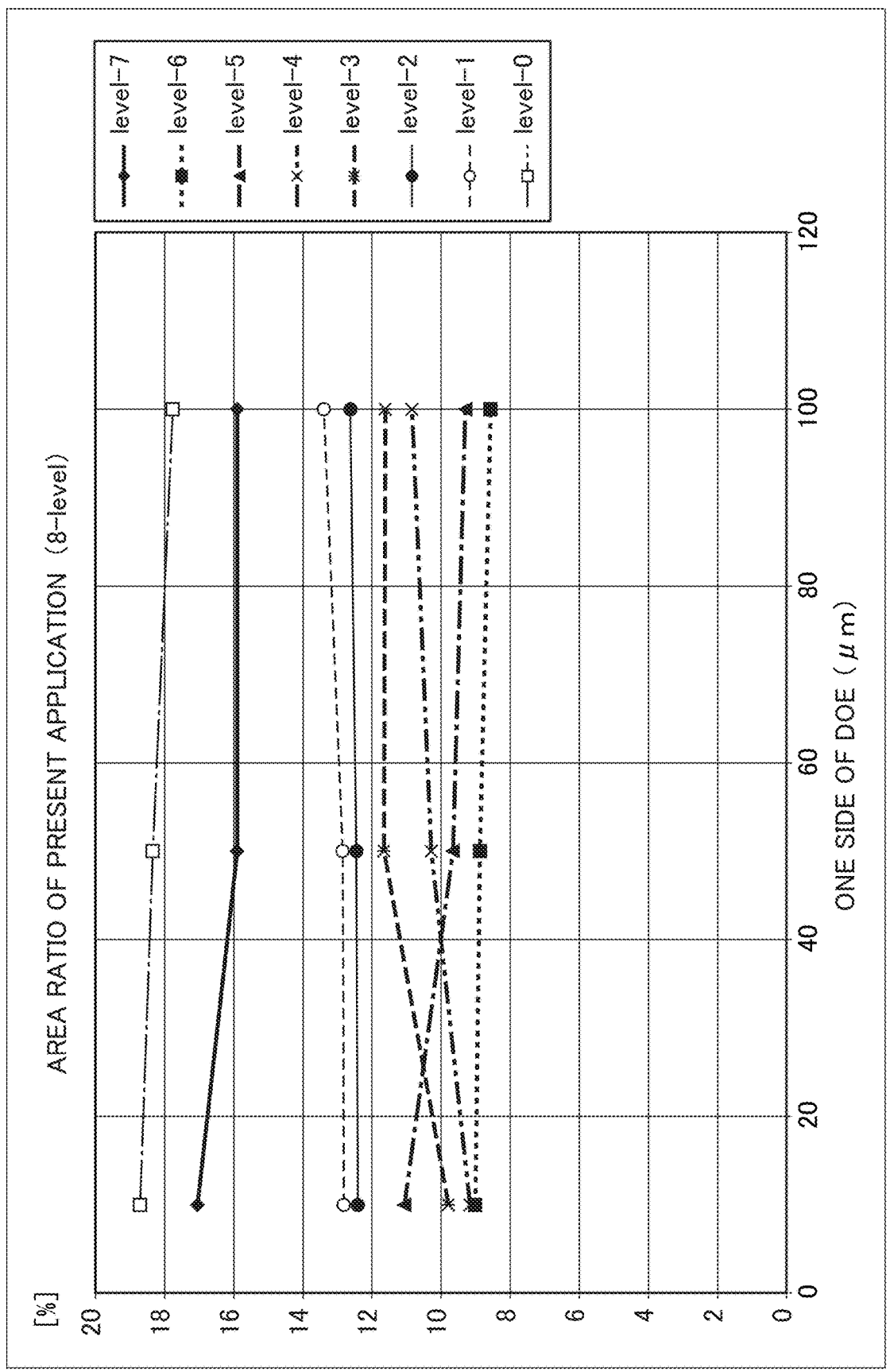

FIG. 30

| level | AREA RATIO (%) | | |
|---|---|---|---|
| | IDEAL DESIGN | PRESENT INVENTION type1 | PRESENT INVENTION type2 |
| 0 | 25.081 | 27.42 | 28.158 |
| 1 | 24.333 | 25.576 | 24.839 |
| 2 | 25.67 | 22.087 | 20.949 |
| 3 | 24.916 | 24.916 | 26.055 |

FIG. 34

| DOE HEIGHT (μm) | ZEROTH-ORDER LIGHT INTENSITY | | |
|---|---|---|---|
| | IDEAL DESIGN | PRESENT INVENTION type1 | PRESENT INVENTION type2 |
| 1.542857 | 0.011643 | 0.005561 | 0.004220 |
| 1.600000 | 0.006289 | 0.003218 | 0.003831 |
| 1.657143 | 0.004011 | 0.002064 | 0.003277 |
| 1.714286 | 0.003490 | 0.001788 | 0.003252 |
| 1.771429 | 0.002911 | 0.001706 | 0.003171 |
| 1.828571 | 0.002381 | 0.001025 | 0.002473 |
| 1.885714 | 0.003699 | 0.000729 | 0.000854 |
| 1.942857 | 0.007399 | 0.002684 | 0.000656 |
| 2.000000 | 0.011776 | 0.005744 | 0.002213 |

DIFFRACTIVE OPTICAL ELEMENT

TECHNICAL FIELD

The present invention relates to a diffractive optical element.

BACKGROUND ART

In recent years, with the spread of networks, because of the need for personal identification to avoid security risks, the trend of automated driving of cars, and the spread of the so-called "Internet of Things", the need for sensor systems has increased. There are various types of sensors, and types of information to be detected are various. In one of the means, an object is irradiated with light emitted from a light source, and information is obtained from reflected light. For example, a pattern authentication sensor, an infrared radar, or the like is an example.

As the light sources of these sensors, light sources having wavelength distribution, brightness, and spread according to the application are used. The wavelength of visible light to infrared light is often used as the light wavelength. In particular, since infrared light is not easily affected by external light, is invisible, and can be used to observe the interior of an object, the infrared light is widely used. In addition, as a type of light source, an LED light source, a laser light source, and the like are often used. For example, a laser light source with small spread of light is suitably used to detect a distant place, and an LED light source is suitably used to detect a relatively close place or to illuminate an area having a certain extent of spread.

By the way, the size and shape of the target irradiation area do not necessarily coincide with the spread (profile) of the light from the light source. In that case, the light needs to be shaped by a diffusion plate, a lens, a shielding plate, or the like. Recently, a diffusion plate called a light shaping diffuser (LSD) has been developed that can shape the shape of light to some extent. In addition, as another means of shaping light, a diffractive optical element (DOE) can be exemplified. This is an application of the diffraction phenomenon when light passes through a location where materials having different refractive indexes are arranged with periodicity. The DOE is basically designed for light having a single wavelength, but theoretically, it is possible to shape the light into an almost arbitrary shape. In addition, in the LSD described above, the light intensity in the irradiation area has a Gaussian distribution, whereas in the DOE, it is possible to control the uniformity of the light distribution in the irradiation area. Such characteristics of the DOE have advantages in terms of high efficiency by suppressing irradiation on unnecessary regions, miniaturizing the device by reduction of the number of light sources, and the like (refer to, for example, Patent Document 1). In addition, the DOE is compatible with both parallel light sources such as lasers and diffused light sources such as LEDs and is applicable to a wide range of wavelengths from ultraviolet light to visible light and infrared light.

In a case where the predetermined area is uniformly irradiated with light by using the DOE, the zeroth-order diffraction light may be gathered, for example, in the vicinity of the center of the irradiation area to be a hindrance. This tendency is strong particularly when the light source is a laser. In the related art, when it is attempted to reduce the zeroth-order diffraction light, the necessary first-order diffraction light is also decreased accordingly. Therefore, it has been required to reduce the zeroth-order diffraction light while suppressing the decrease in the necessary first-order diffraction light.

It is considered that, by allowing the grating surface of the DOE to have a sawtooth shape (blazing), a specific wavelength can be efficiently concentrated and diffracted to a specific order, and thus, configuring this sawtooth shape imitated by a multi-stage shape having a step shape has been performed in the related art (for example, Patent Document 1).

However, if the shape is only a sawtooth shape (blaze), unnecessary zeroth-order diffraction light is still large, and it has been preferable to further reduce the zeroth-order diffraction light.

Patent Document 1: Japanese Unexamined Patent Application, Publication No. H09-230121

DISCLOSURE OF THE INVENTION

Problems to be Solved by the Invention

An object of the present invention is to provide a diffractive optical element capable of further reducing zeroth-order diffraction light.

Means for Solving the Problems

The present invention solves the above problems by the following solution means. In addition, for the better understanding, the description is made while attaching the symbols corresponding to the embodiment of the present invention, however, the present invention is not limited thereto.

A first invention is a diffractive optical element (10) shaping light, including a diffraction layer (15) including: a high refractive index part (11) in which a plurality of projections (11a) are arranged side by side; and a low refractive index part (14) having a refractive index lower than that of the high refractive index part (11) and including a recess (12) formed at least between the projections (11a), in which the projection (11a) has a multi-stage shape formed by a plurality of stage portions having different heights, and in which a deepest surface of the high refractive index part (11) has the largest area per unit area, and a surface of a next stage of the uppermost surface of the high refractive index part (11) has the smallest area per unit area.

A second invention is the diffractive optical element (10) according to the first invention, in which the area of the uppermost surface of the high refractive index part (11) is 0.6 to 0.9 times the area of the lowermost surface of the high refractive index part.

A third invention is the diffractive optical element (10) according to the first invention or the second invention, in which the area of each stage portion of the high refractive index part (11) sequentially decreases from the deepest surface toward the surface of the next stage of the uppermost surface per unit area.

A fourth invention is a diffractive optical element (10) shaping light, including a diffraction layer (15) including: a high refractive index part (11) in which a plurality of projections (11a) are arranged side by side in a cross-sectional shape; and a low refractive index part (14) having a refractive index lower than that of the high refractive index part (11) and including a recess (12) formed at least between the projections (11a); in which the projection (11a) has a sawtooth shape or a shape in which the sawtooth shape is imitated by a multi-stage outline shape, and in which an inclined plane inclined with respect to a sheet surface of the diffractive optical element (10) having a sawtooth shape or a sawtooth shape imitated by a multi-stage outline shape has a concave curved plane which is concave toward the projection (11*a*).

A fifth invention is the diffractive optical element (10) according to the fourth invention, in which the projection (11*a*) has a multi-stage shape imitating the sawtooth shape by a plurality of stage portions having different heights on at least one side of a side surface shape, and in which the concave curved plane is imitated by changing at least one of the height and width of the stage portion according to a location.

A sixth invention is the diffractive optical element according to the fourth invention or the fifth invention, in which the projection has a multi-stage shape imitating the sawtooth shape by a plurality of stage portions having different heights on at least one side of a side surface shape, and in which the deepest surface has the largest area per unit area, and the surface of the next stage of the uppermost surface has the smallest area per unit area.

A seventh invention is the diffractive optical element (10) according to the fifth invention or the sixth invention, in which the height per stage of the stage portion is constant, and in which the concave curved plane is imitated by changing the width of the stage portion according to a location.

An eighth invention is the diffractive optical element (10) according to the seventh invention, in which, when a direction in which the projections (11*a*) are arranged is set as an x axis, and a direction in which the inclined plane is elevated is set as a positive direction of the x axis, a y axis is set to be perpendicular to the sheet surface of the diffractive optical element (10), and a projecting direction of the projection (11*a*) is set as a positive direction of the y axis, the total number of stages of the stage portions counted including a distal end of the projections (11*a*) is denoted by L, a rate of decrease in width at each level is denoted by f, the number of stages of a target stage portion in the case of performing counting by setting a lowest position of the recess (12) to 0 is denoted by lv, a height of the stage portion per stage is set to a constant value of h, and a width ratio of level zero is denoted by C, a curved line which is a locus configured with a concave vertex of level zero and a vertex of each projection in a cross section of the concave curved plane imitated by a multi-stage shape is expressed by the following formulas,
when the ratio of the x coordinate to a pitch is denoted by S and the followings are defined as:

$$x'=0.5 \times f \times lv^2 + C \times lv;$$

$$S=P/\{tw+\Sigma x'i\}; \text{ and}$$

$\Sigma$ is performed over i=0 to L-1,
the x and y coordinates of the vertexes of the step shape are expressed as follows.

$$x=0.5 \times f \times lv^2 + C \times lv$$

$$y=lv \times h.$$

A ninth invention is the diffractive optical element (10) according to any one of the first invention to the eighth invention, in which the high refractive index part (11) forms a diffraction grating having a pattern where a boundary between the projection (11*a*) and the recess (12) includes at least one of a curved line and a polygonal line connecting a plurality of line segments as viewed from a normal direction of a surface on which the concavo-convex shape is formed.

A tenth invention is the diffractive optical element (10) according to any one of the first invention to the eighth invention, in which the high refractive index part (11) forms a grating cell array type (also referred to as "GCA type") diffraction grating formed in a lattice-like pattern where a plurality of unit cells in which identical concavo-convex shapes are arranged side by side are tiled as viewed from a normal direction of a surface on which the concavo-convex shape is formed.

Effects of the Invention

According to the present invention, it is possible to suppress reduction of diffraction efficiency of first-order light and reduce zeroth-order light.

BRIEF DESCRIPTION OF THE DRAWINGS

FIG. 3 is a cross-sectional view of the diffractive optical element cut at a position of an arrow G-G' in FIG. 2A.

In FIG. 9, values of x and y are also added.

In FIG. 10, values of x and y are also added.

FIG. 15 is a diagram summarizing a simulation result.

FIG. 28B is a diagram illustrating the ratio of each surface to the area of the 8-level diffractive optical element according to the present invention.

FIG. 30 is a diagram illustrating area ratios of three types of diffractive optical elements.

FIG. 34 is diagram illustrating simulation results of the three types of diffractive optical elements by numerical values.

PREFERRED MODE FOR CARRYING OUT THE INVENTION

Hereinafter, best modes for carrying out the present invention will be described with reference to the drawings and the like.

Embodiment

Figure 1A:
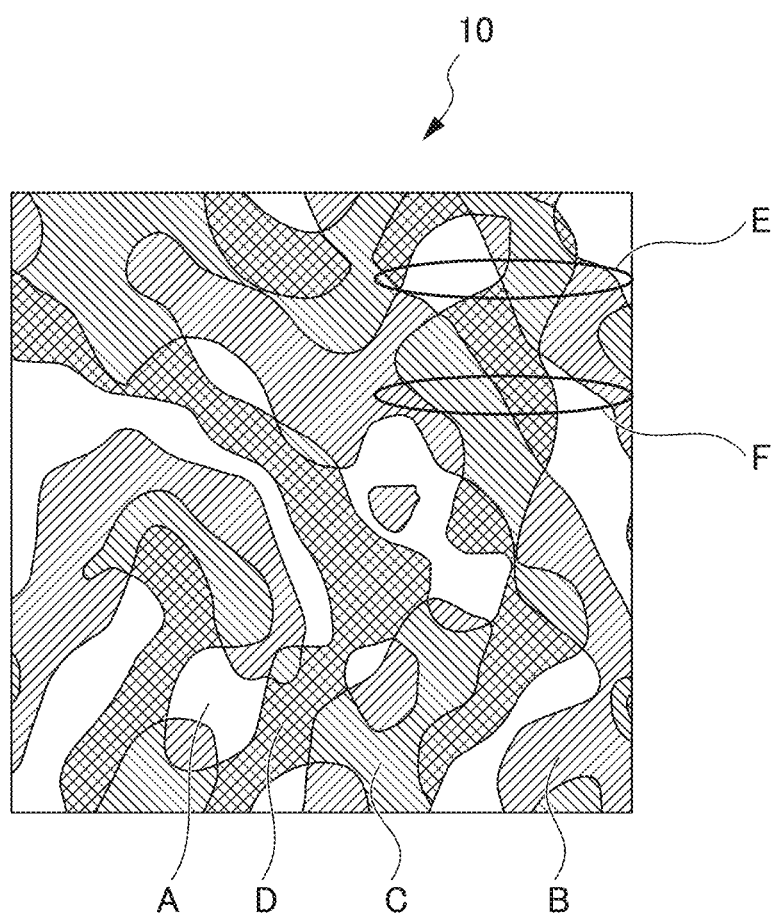
FIG. 1A is a plan view illustrating an example of a diffractive optical element in which a concavo-convex shape of a diffraction grating viewed from a normal direction of a sheet surface is formed in a regular or irregular pattern where a boundary between the projection and the recess includes a curved line.

FIG. 1A is a plan view illustrating an example of a diffractive optical element in which a concavo-convex shape of a diffraction grating viewed from a normal direction of a sheet surface is formed in a regular or irregular pattern where a boundary between the projection and the recess includes a curved line. In the present embodiment, as an example, the present invention can be applied to a diffractive optical element having a concavo-convex shaped pattern that looks irregular at first glance as illustrated in FIG. 1A. In the following description, a diffractive optical element of the type illustrated in FIG. 1A will also be referred to as an irregular type. However, since this irregular pattern may be a regular pattern depending on an aimed output pattern of the diffractive optical element, the term "irregular type" is a name for convenience and is not limited to irregular. In addition, in FIG. 1A, although the irregular pattern is formed by a curved line, in some cases, a pattern where a polygonal line is formed by connecting line segments including straight lines or curved lines may be included depending on an aimed output pattern of the diffractive optical element. Therefore, the pattern of the irregular-type diffraction grating, as viewed from the normal direction of the surface of the high refractive index part (described later) on which the concavo-convex shape is formed, the boundary between the projection and the recess includes at least one of a curved line and a polygonal line formed by connecting a plurality of line segments.

Figure 1B:
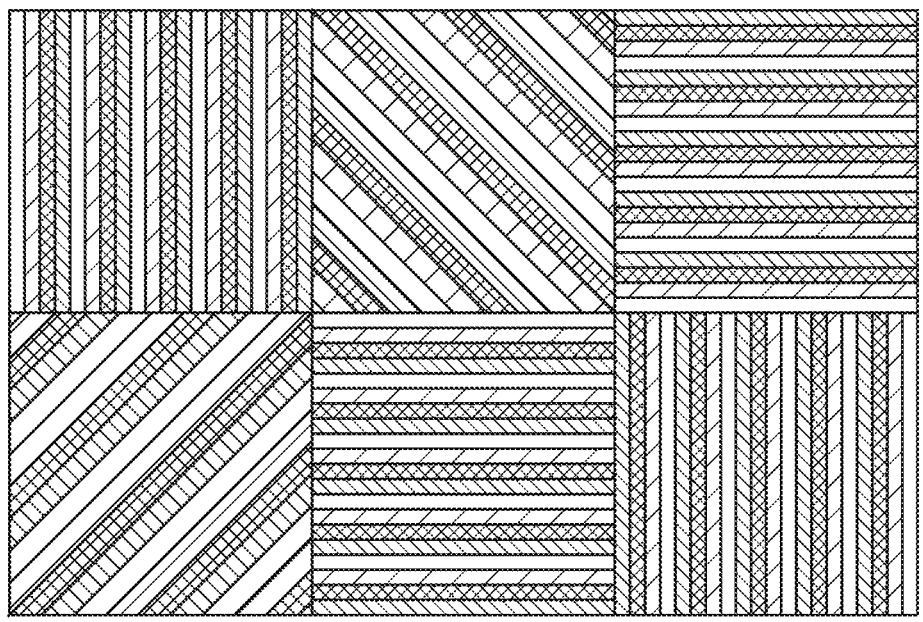
FIG. 1B is a plan view illustrating an example of a diffractive optical element in which a concavo-convex shape of a diffraction grating viewed from a normal direction of a sheet surface is formed in a lattice-like pattern where a plurality of unit cells in which identical concavo-convex shapes are arranged side by side are tiled.

FIG. 1B is a plan view illustrating an example of a diffractive optical element in which a concavo-convex shape of a diffraction grating viewed from a normal direction of a sheet surface is formed in a lattice-like pattern where a plurality of unit cells in which identical concavo-convex shapes are arranged side by side are tiled. In the present embodiment, as another example, as illustrated in FIG. 1B, the present invention can be applied to a diffractive optical element formed in a lattice-like pattern where a plurality of unit cells in which identical concavo-convex shapes are arranged side by side are tiled. In the following description, the diffractive optical element of the type illustrated in FIG. 1B is also referred to as a grating cell array type or a GCA type. In the grating cell array type diffractive optical element, the direction and angle of light diffracted by the diffraction grating are different for each unit cell, and a large number of the unit cells are tiled, so that a diffractive optical element capable of obtaining desired optical properties is configured. That is, in the grating cell array type diffractive optical element, the high refractive index part is partitioned in a lattice shape as viewed from the normal direction of the surface on which the concavo-convex shape is formed, the projections having identical shape which extend in the specific direction within the partition are arranged side by side in the direction perpendicular to the specific extending direction, and the width and the extending direction of the projections are different for each partition.

Figure 2A:
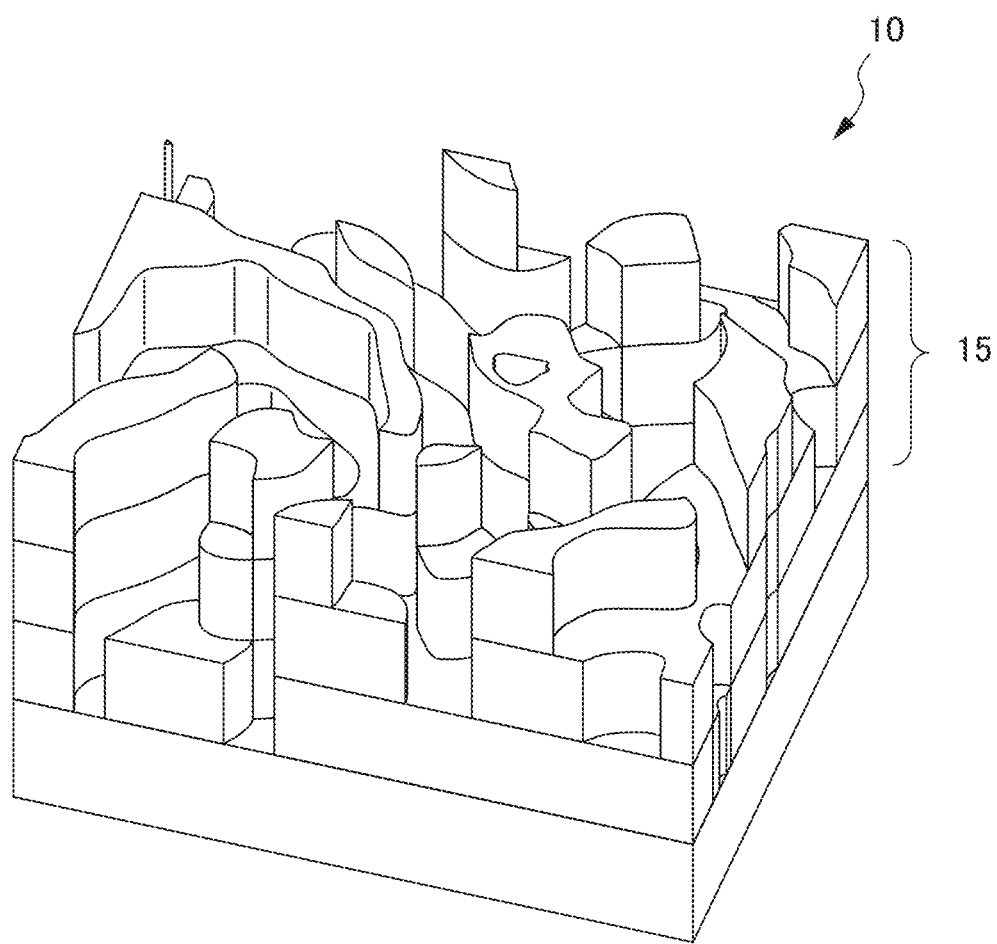
FIG. 2A is a perspective view illustrating an example of a partial periodic structure in an example of an irregular-type diffractive optical element illustrated in FIG. 1A.
Figure 2B:
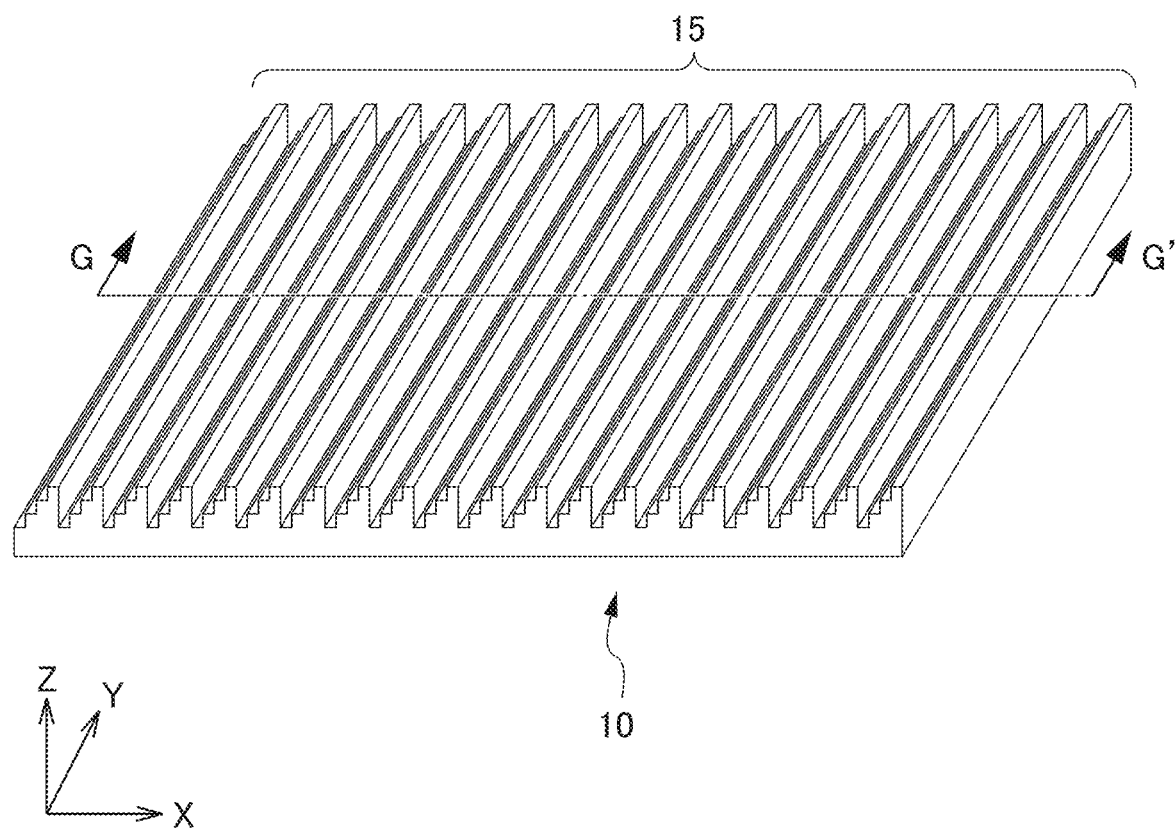
FIG. 2B is a perspective view illustrating an example of a partial periodic structure in an example of a GCA-type diffractive optical element illustrated in FIG. 1B.
Figure 4:
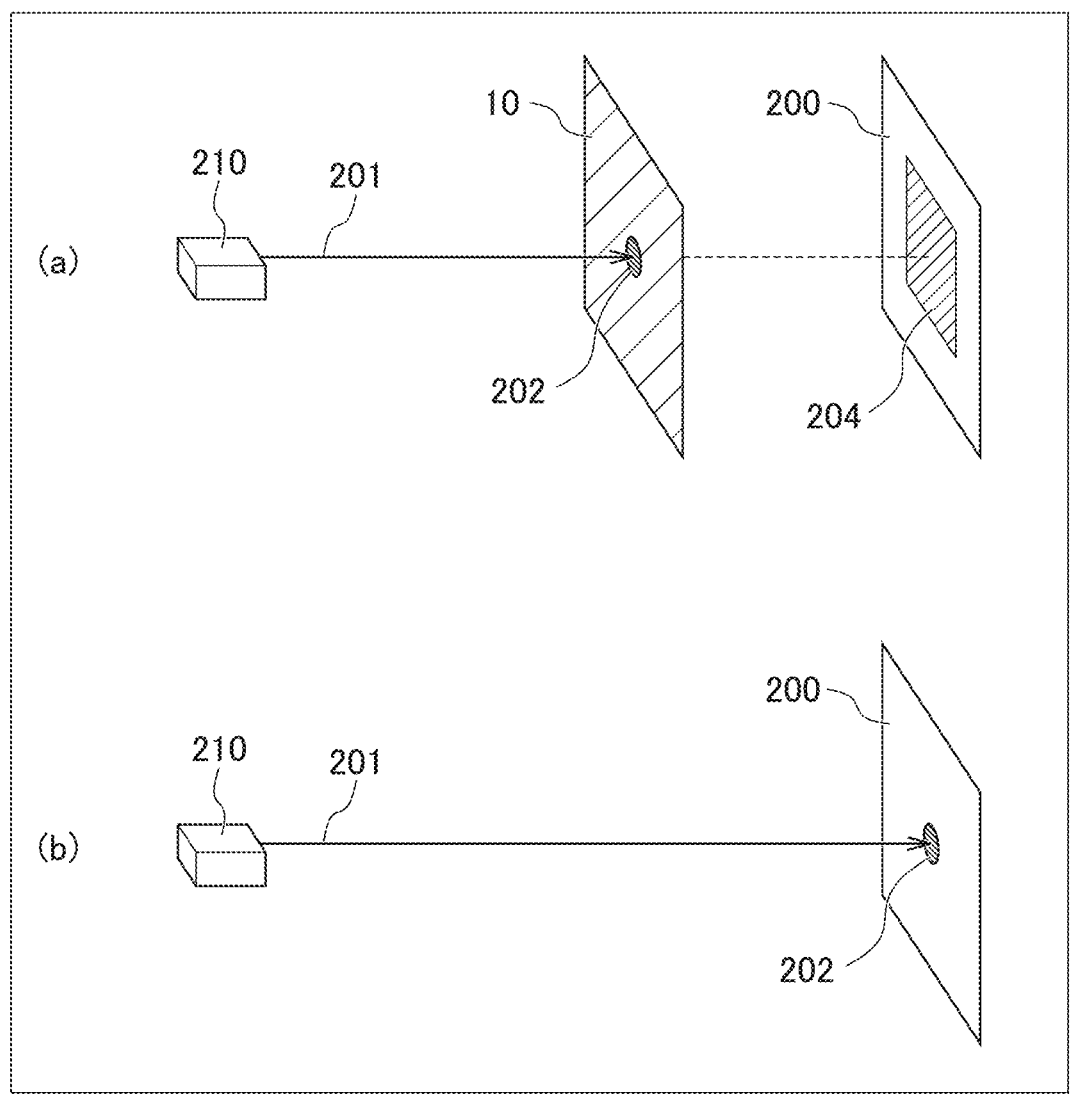
FIG. 4 is a diagram describing the diffractive optical element.

FIG. 2A is a perspective view illustrating an example of a partial periodic structure in an example of an irregular-type diffractive optical element illustrated in FIG. 1A. FIG. 2B is a perspective view illustrating an example of a partial periodic structure in an example of a GCA-type diffractive optical element illustrated in FIG. 1B. FIG. 3 is a cross-sectional view of the diffractive optical element cut at a position of an arrow G-G' in FIG. 2A. In the following description, since it is necessary to grasp a cross-sectional shape unique to the GCA type, the description will be mainly made by taking the irregular type as an example. However, with respect to the GCA type as well, if the diffractive optical element is cut at a position of an arrow G-G' illustrated in FIG. 1A, the cross-sectional shapes becomes similar, and as described above, the present invention is applicable as well. FIG. 4 is a diagram describing the diffractive optical element. In addition, each figure illustrated below including FIG. 1 is a figure schematically illustrating, and the size and shape of each portion are appropriately exaggerated in illustration for the better understanding. In addition, in the following description, although the description is made by illustrating specific numerical values, shapes, materials, and the like, these can be appropriately changed.

In addition, the terms used to specify shapes and geometrical conditions, and degrees thereof, for example, the terms such as "parallel", "perpendicular", and "identical", values of lengths and angles, and the like are to be interpreted including the extent to which the same function can be expected without being limited by strict meanings.

In addition, in the present invention, the phrase "to shape the light" denotes that the shape (irradiation area) of the light projected onto the object or the target area becomes an arbitrary shape by controlling the traveling direction of the light. For example, as illustrated in the example of FIG. 4, a light source unit 210 is provided which emits light 201 (FIG. 4(b)) by which an irradiation area 202 becomes circular when the light is projected directly onto a planar screen 200. The phrase "to shape the light" denotes that, by allowing the light 201 to pass through the diffractive optical element 10 according to the present invention, the irradiation area 204 can be made into a target shape such as a square (FIG. 4(a)), a rectangle, and a circle (not illustrated).

In addition, by combining the light source unit 210 and at least one diffractive optical element 10 according to the present embodiment which is arranged at the position through which the light emitted by light source unit 210 passes, an irradiation device capable of irradiating the light in the state that the light is shaped can be obtained. In addition, in the present invention, the term "transparent" denotes that light having at least a wavelength to be used is transmitted. For example, even in a case where visible light is not transmitted, if infrared light is transmitted, it can be treated as "transparent" in the case of being used for infrared applications.

The diffractive optical element 10 according to the present embodiment is a diffractive optical element (DOE) that shapes light. The diffractive optical element 10 is designed so as to spread light from the light source unit 210 that emits light with a wavelength of, for example, 500 nm in a cross shape, specifically, a shape where two bands of light spreading with a width of ±3.3 degrees are toleranced at, for example, ±50 degrees. The diffractive optical element 10 according to the present embodiment has different depths at the respective positions of A, B, C, and D illustrated in FIGS. 1A and 1B. That is, the diffractive optical element 10 is configured by a multi-stage shape having four different heights. Then, the diffractive optical element 10 generally has a plurality of regions (partial periodic structures: for example, E and F regions in FIGS. 1A and 1B) having different periodic structures. In FIGS. 2A and 2B, an example of the partial periodic structure is extracted and illustrated. As illustrated in FIG. 3, the diffractive optical element 10 includes a high refractive index part 11 in which a plurality of projections 11a are arranged side by side in a cross-sectional shape. In the GCA-type diffractive optical element, the high refractive index part 11 extends in the depth direction of the cross section while maintaining the same cross-sectional shape. On the other hand, in the irregular-type diffractive optical element, when the cross-sectional position changes, the cross-sectional shape changes, and thus, a large number of diffraction gratings having various cross-sectional shapes are arranged. In addition, in the irregular type, the cross section for specifying the shape of the diffraction grating, that is, the cross-sectional structure for specifying the specific shape of the diffraction grating that affects the diffraction phenomenon of the diffraction light needs to be set as a cross-sectional structure in a cross section which is cut in a direction perpendicular to a line (curved line or straight line) drawn by the boundary between the projection and the recess as viewed from the normal direction of the sheet surface.

The high refractive index part 11 may be formed, for example, by processing quartz ($SiO_2$, synthetic quartz) by etching process. In addition, the high refractive index part 11 may be obtained by generating a mold by performing mold-making from a product obtained by processing quartz and curing an ionizing radiation curable resin composition by using the mold. There are known various methods for manufacturing a product having such a periodic structure by using an ionizing radiation curable resin composition, and the high refractive index part 11 of the diffractive optical element 10 can be produced appropriately by using these known methods.

In addition, since air is present, the upper portion of FIG. 3 including the recess 12 formed between the projections 11a and the space 13 near the vertex of the projection 11a becomes a low refractive index part 14 of which refractive index is lower than that of the high refractive index part 11. A diffraction layer 15 having an action of shaping light is configured by the periodic structure in which the high refractive index parts 11 and the low refractive index parts 14 are alternately arranged.

The projections 11a have a multi-stage shape provided with four stage portions having different heights on one side (left side in FIG. 3) of a side surface shape. Specifically, the projections 11a have a level-3 stage portion 11a-3 which projects the most, a level-2 stage portion 11a-2 lower by one stage than the level-3 stage portion 11a-3, a level-1 stage portion 11a-1 lower by one stage than the level-2 stage portion 11a-2, and a level-0 stage portion 11a-0 lower by one stage than the level-1 stage portion 11a-1 on the one side. In addition, the other side (right side in FIG. 3) of the side surface shape of the projections 11a is a sidewall portion 11b linearly connected from the level-3 stage portion 11a-3 to the level-0 stage portion 11a-0.

Herein, the projections 11a of the present embodiment are a shape in which a sawtooth shape is imitated by a multi-stage outline shape, and the inclined plane inclined to the sheet surface of the diffractive optical element 10 having a sawtooth shape imitated by a multi-stage outline shape has a concave curved plane which is concave toward the projections 11a. Herein, the phrase "imitated by a multi-stage outline shape" denotes that, in the present embodiment, a concave curved plane is formed in a pseudo manner by a line connecting corner portions of each stage portion. However, the phrase is not limited to the corner portions, the phrase may be used for a line connecting the center of the surface of the stage portion or a line connecting the nook portions. In addition, the term "imitate" denotes that the concave curved plane is configured in a pseudo manner. In the present embodiment, it is denoted that, as viewed macroscopically, it is a concave curved plane, but as viewed microscopically, it is configured in a step shape. In another expression, it may be said that "it is approximated." In the example described heretofore, since the form for the 4-level has been described, the form is relatively roughly imitated. However, if the number of levels is 16 levels or more to be described later, the shape can be more accurately imitated.

Figure 5:
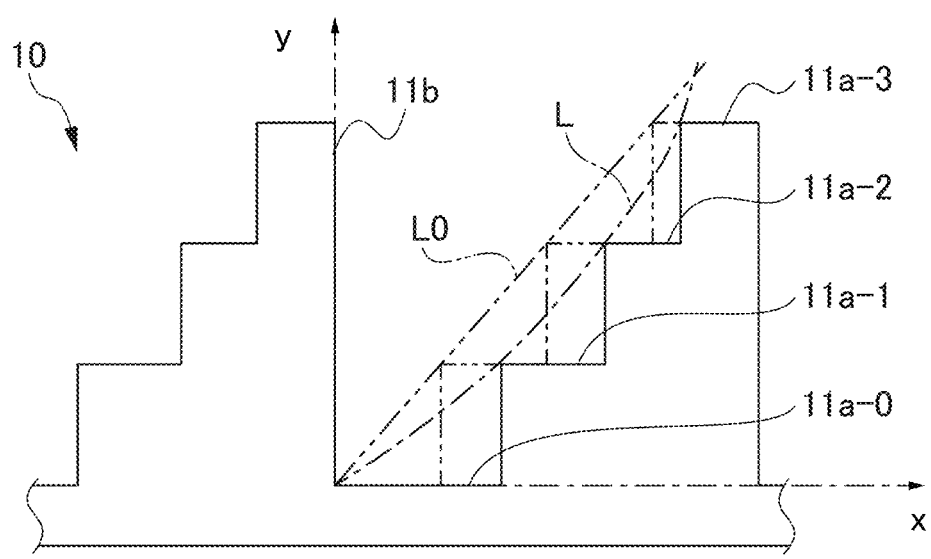
FIG. 5 is a diagram describing a concave curved plane of projections 11*a* in the diffractive optical element 10.
Figure 6A:
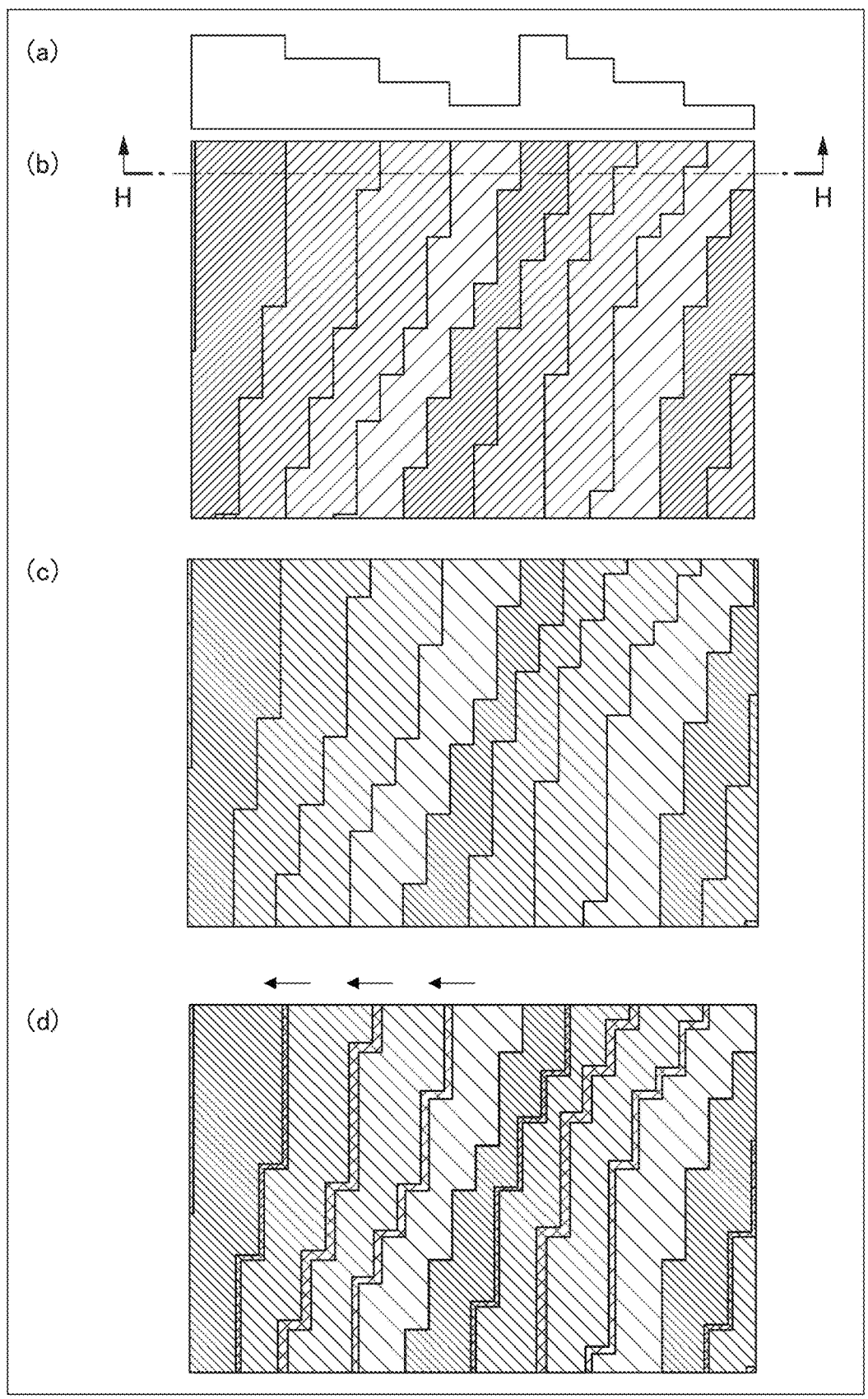
FIG. 6A is a diagram illustrating the diffractive optical element 10 according to the present embodiment in comparison with forms in the related art.

FIG. 5 is a diagram describing the concave curved plane of the projection 11a in the diffractive optical element 10. FIG. 6A is a diagram illustrating the diffractive optical element 10 according to the present embodiment in comparison with the form in the related art. FIG. 6A(a) illustrates a cross section of the diffractive optical element in the related art cut at a position of an arrow H-H in FIG. 6A(b). FIG. 6A(b) is a plan view of the diffractive optical element in the related art as viewed from the normal direction of the sheet surface. FIG. 6A(c) is a plan view of the diffractive optical element 10 according to the present embodiment as viewed from the normal direction of the sheet surface. FIG. 6A(d) is a diagram illustrating FIG. 6A(b) and FIG. 6A(c) in a superimposition manner. In the diffractive optical element in the related art, as illustrated by the two-dot dashed line in FIG. 5, the depth (height) of each stage portion per stage is constant, and the width is also constant. Therefore, in the cross section illustrated in FIG. 5, the inclined plane L0 connecting the corner portions of the stage portions of the diffractive optical element in the related art is a flat surface (straight line in the cross section). On the other hand, in the diffractive optical element 10 according to the present embodiment, the inclined plane L connecting the corner portions of the stage portions is a concave curved plane (concave curved line in the cross section) concave toward the projections 11a. In order to imitate the above-mentioned concave curved plane, the depth (height) of each stage portion may be changed, the width of each stage portion may be changed, and both thereof may be combined. However, by taking into consideration the manufacturing method of manufacturing the stage portion by the etching process, the method of changing the width of each stage portion is a method capable of performing manufacturing most easily. Therefore, in the diffractive optical element 10 according to the present embodiment, in order to imitate the above-described concave curved plane, the width of each stage portion is gradually narrowed as the depth of the recess is decreased. Therefore, as illustrated in FIGS. 5 and 6, the width of the projections 11a is also narrowed as a whole.

Figure 6B:
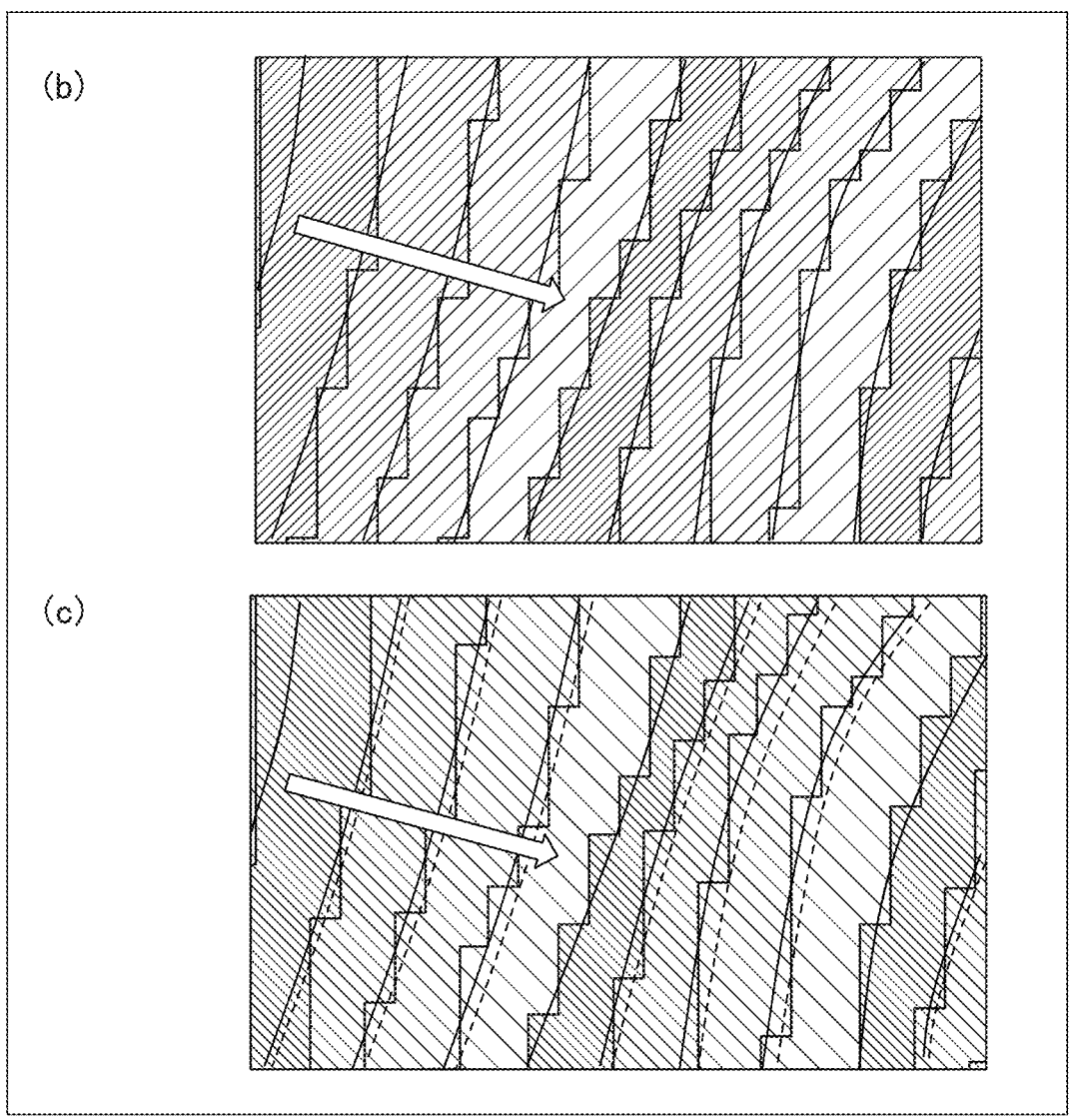
FIG. 6B is a diagram illustrating curved lines of an original design pattern superimposed on the diagram of FIG. 6A.

In the irregular-type diffractive optical element 10, as illustrated in FIG. 1A, in design, there are many portions where the line drawn by the boundary between the projection and the recess is a curved line. Then, as described above, the cross-sectional structure that affects the optical properties of the diffractive optical element is a cross-sectional structure in a cross section in the direction (normal direction) perpendicular to the curved line. However, in many cases, the actual diffractive optical element 10 is manufactured in a shape in which the line drawn by the boundary between the projection and the recess approximates a curved line by a fine polygonal line shape, in particular, a polygonal line shape connecting straight lines in two perpendicular directions as illustrated in FIG. 6A. This is mainly due to manufacturing convenience. In this case, if the cross-sectional structure illustrated in FIG. 5 is examined, for example, by cutting a cross section as illustrated in FIG. 6A(a), the width of each stage is affected by the cutting position to become wider or narrower than the width to be examined as an original cross-sectional structure, and thus, correct examination cannot be performed. FIG. 6B is a diagram illustrating curved lines of an original design pattern superimposed on the diagram of FIG. 6A. FIG. 6B(b) is a diagram in which the curved line of the ideal design pattern is superimposed on FIG. 6A(b), and FIG. 6B(c) is a diagram in which the curved line of the ideal design pattern and the curved line of the design pattern of the present embodiment are superimposed on FIG. 6A(c). In addition, a solid line in FIG. 6B(c) is a curved line of the ideal design pattern, and a broken line is a curved line of the design pattern of the present embodiment. FIG. 6B clearly illustrates that the width of each stage portion is gradually narrowed as the depth of the recess is decreased. Thus, in the case of examining the width of each stage portion in the diffractive optical element actually manufactured, the curved line on design is obtained by a curved line connecting the vertexes as illustrated in FIG. 6B, and it is important to examine the cross-sectional shape and the sizes of the width in the direction perpendicular to the curved line.

Figure 7:
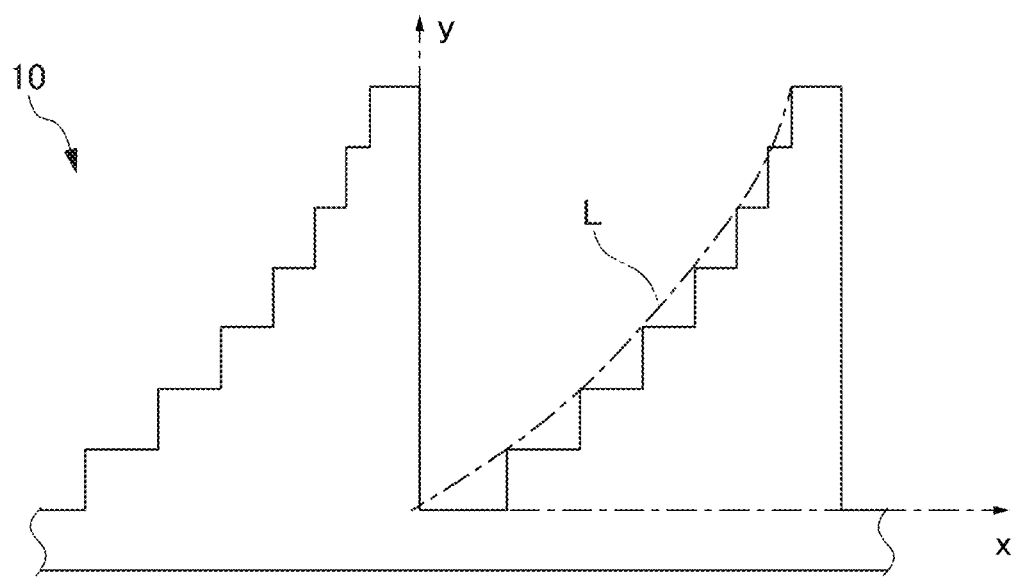
FIG. 7 is a diagram illustrating a diffractive optical element 10 having a multi-stage shape having 8-level.

Although the example of the multi-stage shape having 4-level has been described above, the number of stages may be set to be larger. FIG. 7 is a diagram illustrating a diffractive optical element 10 having a multi-stage shape having 8-level. If the number of stages is increased in this manner, the accuracy of imitating a concave curved plane becomes high.

Figure 8:
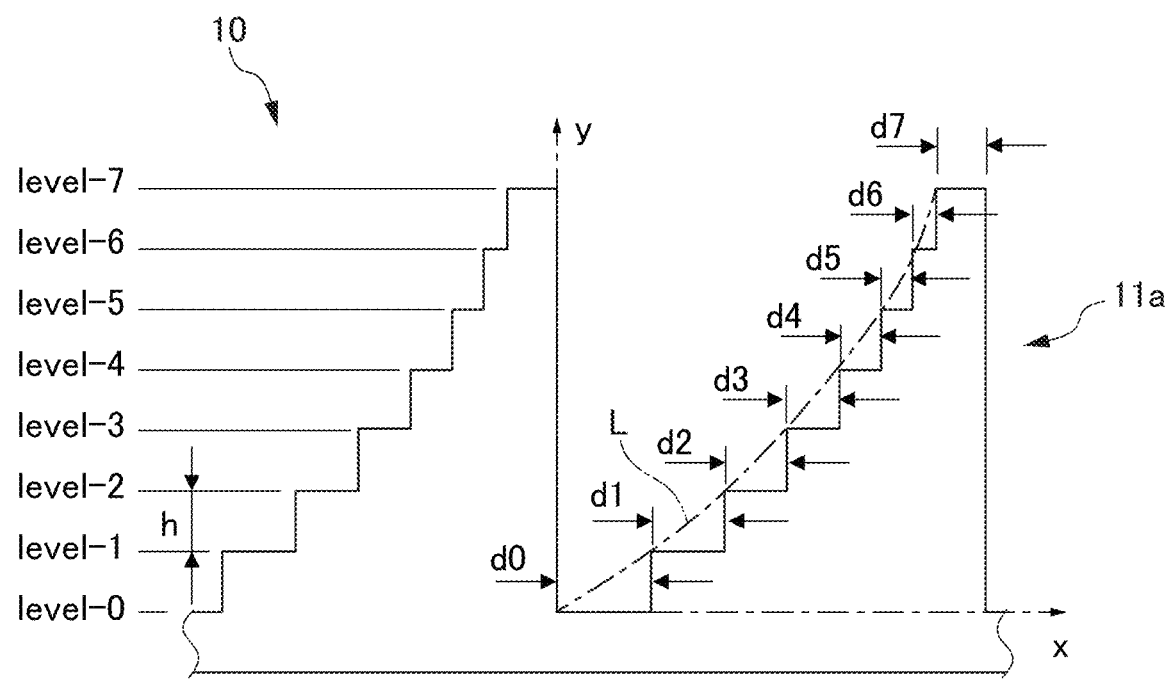
FIG. 8 is a diagram describing a curved line in a cross section of a concave curved plane and a multi-stage shape.

Herein, the inclined plane having a sawtooth shape has a shape imitating a concave curved plane, and thus, the shape of this curved plane will be described. FIG. 8 is a diagram describing a curved line in a cross section of a concave curved plane and a multi-stage shape. The x-y perpendicular coordinates as illustrated in FIG. 8 are provided. That is, a direction in which the projections 11a are arranged is set as an x axis, a direction in which the inclined plane is elevated is set as a positive direction of the x axis, a y axis is set to be perpendicular to the sheet surface of the diffractive optical element 10, and a projecting direction of the projection 11a is set as a positive direction of the y axis. The total number of stages of the stage portions counted including the distal end of the projections 11a is denoted by L. In addition, the rate of decrease in width for each level is denoted by f. Furthermore, the number of stages of the target stage portion in the case of performing counting by setting the lowest position of the recess to 0 is denoted by lv, the height of each stage portion per stage is set to a constant value of h, and the width ratio of level zero is denoted by C. Then, a curved line (curved line which is a locus configured with a concave vertex of level zero and a vertex of each projection) in a cross section of a concave curved plane imitated by a multi-stage shape is expressed by the following formulas. when the ratio of the x coordinate to a pitch is denoted by S and the followings are defined as:

$$x'=0.5\times f\times lv^2+C\times lv;$$

$$S=P/\{tw+\Sigma x'i\}; \text{ and}$$

$\Sigma$ is performed over i=0 to L−1,
the x and y coordinates of the vertexes of the step shape are expressed as follows.

$$x=S\times(0.5\times f\times lv^2+C\times lv)$$

$$y=lv\times h$$

In addition, when the number of levels of the multi-stage shape is n and the width of the highest level is tw, the pitch is a normalized value of:
$0.5\times f\times(n-1)2+C\times(n-1)+tw$. In addition, the width ratio C of level zero denotes the ratio of the width of level zero, which is the lowest position of the recess, to the width per stage in a case where the width of each stage portion in the related art is constant. Herein, if the height h of each stage portion per stage is set to be h=ht×1.05 to h=ht×1.15 with respect to the theoretical value ht, a good result can be obtained. In addition, the theoretical value is ht=wavelength/{number of levels (refractive index−1)}.

In addition, the widths d0 to d7 of each stage portion (level) are defined as follows by pitch ratio.

$$di=C+i\times f.$$

However, i is an integer of 0 to 6.
Herein, f<0.
In addition, in a diffractive optical element having a maximum diffraction angle of 10° or more, when $$-20 \leq C/f \leq -6,$$

preferably, $$-16 \leq C/f \leq -10.5, \text{ and}$$

$$-0.0275 \leq f \leq -0.0125,$$

$0.13 \leq C \leq 0.4$ is obtained,
and in a case where C is in this range, preferably,
$-0.0225 \leq f \leq -0.0125$ is obtained.
When the ratio of the width of the uppermost level to the width of the zero level which is the deepest surface is denoted by t,
$0.5 \leq t \leq 0.9$ is obtained, and
$0.6 \leq t \leq 0.8$
is preferable.

Figure 9:
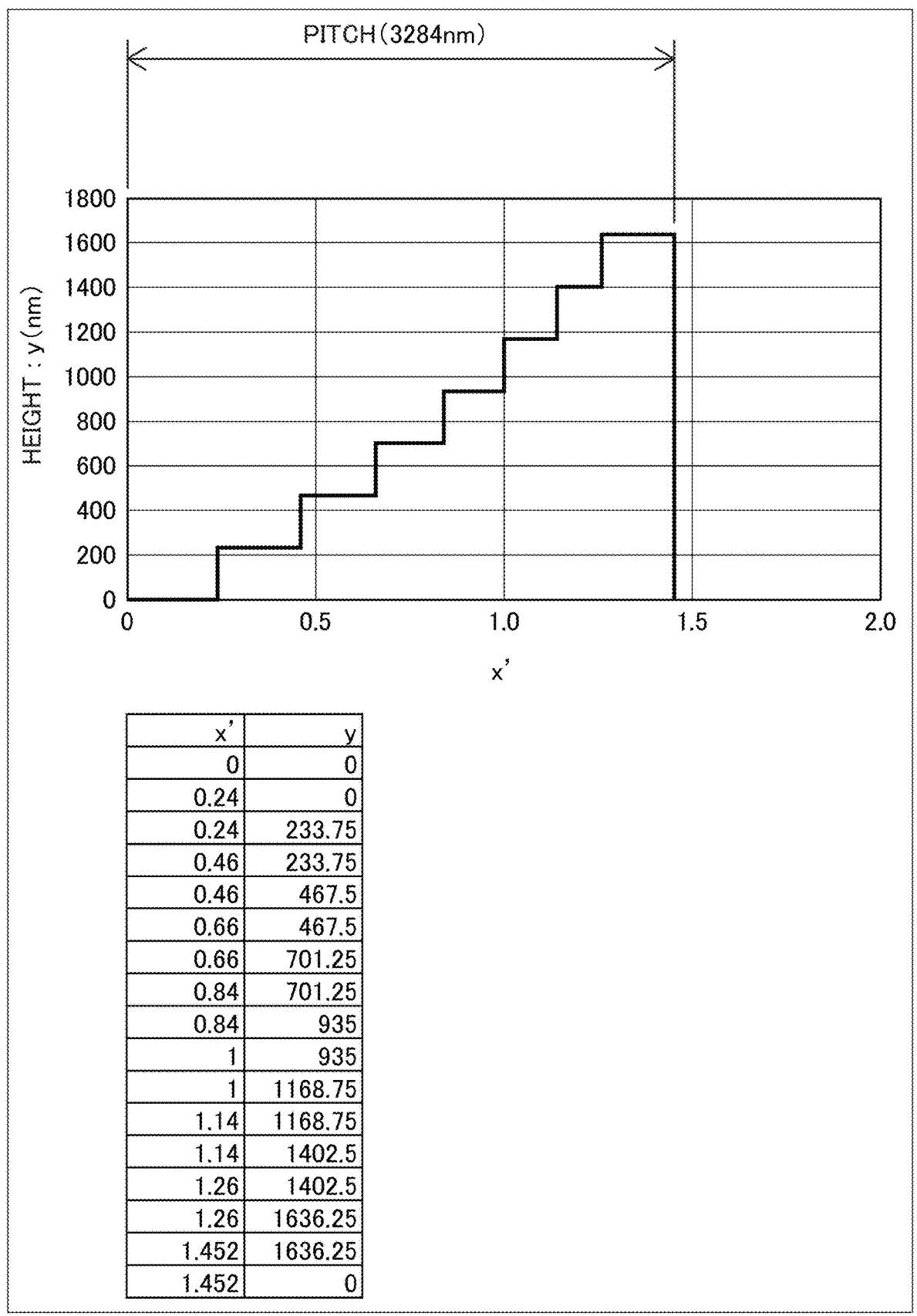
FIG. 9 is a diagram illustrating a specific example of a cross-sectional shape having 8-level.

Hereinafter, specific examples are illustrated. FIG. 9 is a diagram illustrating a specific example of a cross-sectional shape having 8-level. In a table shown below in FIG. 9, values of x' and y are also added. The x' denotes the lateral position of the vertex when the cross section of the step structure is seen, the y denotes the longitudinal position. These are the coordinate data (vertex coordinates) of the cross-sectional shape (step structure) illustrated as a graph in FIG. 9. In addition, also in the following figures, the values in the table shown together with the graph indicate the coordinate data in the graph. In the example of FIG. 9, a wavelength of 850 nm, a pitch=3284 nm (diffraction angle of 15°), 8-level, f=−0.02, C=0.25, t=0.8, h=850/8*1.1*(n−1), and n=1.5 are set. In this case, C/f=−12.5 is obtained.

$$x'=0.5\times f\times lv^2+C\times lv$$

From the above formula, the width from the zero level to the uppermost level is 1.4542, and the width of each level is the width derived from the x value×3284/1.4542. The zeroth-order light intensity at this time is 0.15776%, which is sufficiently small.

Figure 10:
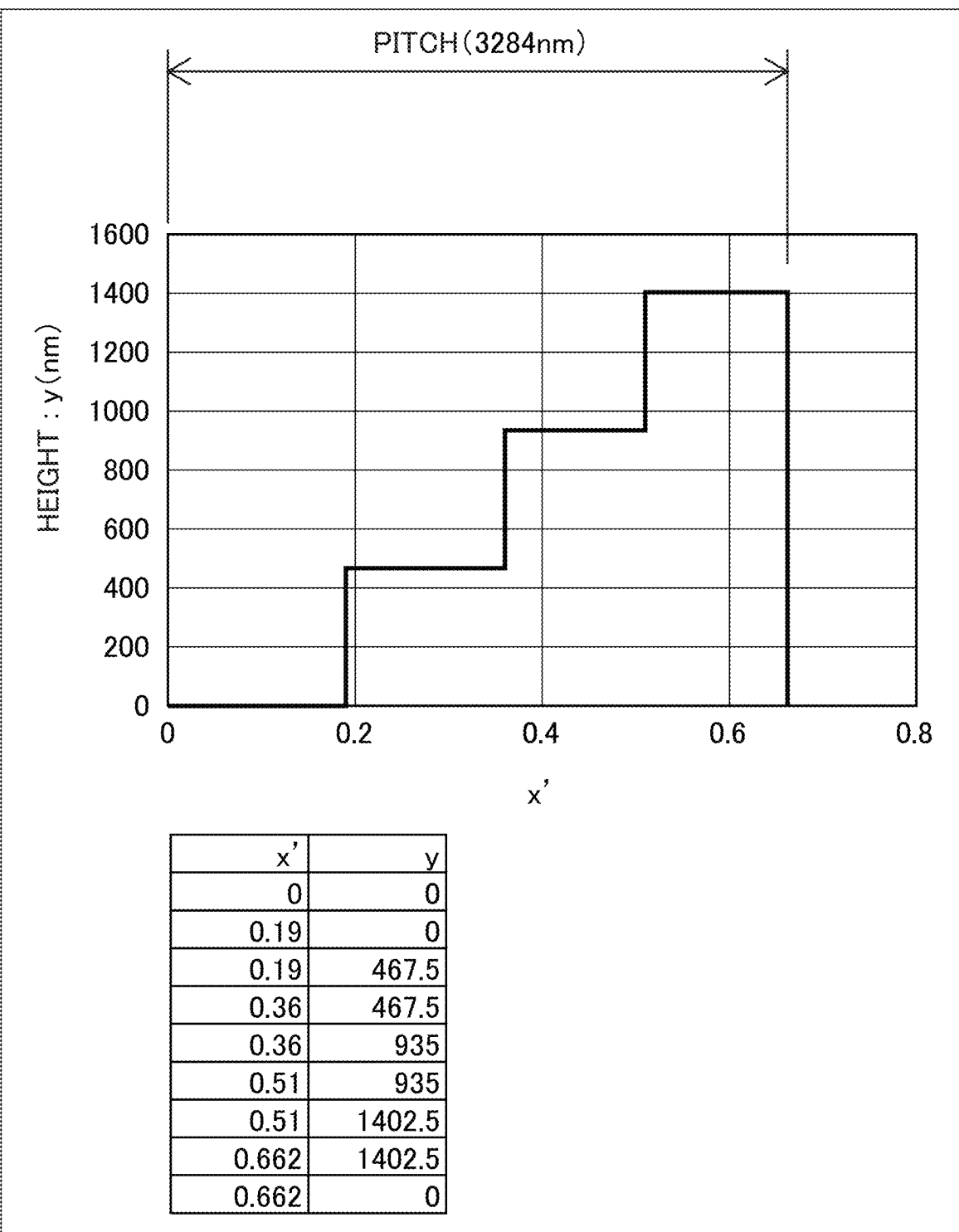
FIG. 10 is a diagram illustrating a specific example of a cross-sectional shape having 4-level.

FIG. 10 is a diagram illustrating a specific example of cross-sectional shape having 4-level. In FIG. 10, values of x and y are also added. In the example of FIG. 10, a wavelength of 850 nm, a pitch=3284 nm (diffraction angle of 15°), 4-level, f=−0.02, C=0.2, t=0.8, h=850/4*1.1(n−1.0), n=1.5 are set. In this case, C/f=−10 is obtained.

$$x'=0.5\times f\times lv^2+C\times lv$$

From the above formula, the width from the zero level to the uppermost level is 0.662, and the width of each level is the width derived from the x value×3284/0.662. The zeroth-order light at this time is 0.2803%, which is sufficiently small.

Figure 11:
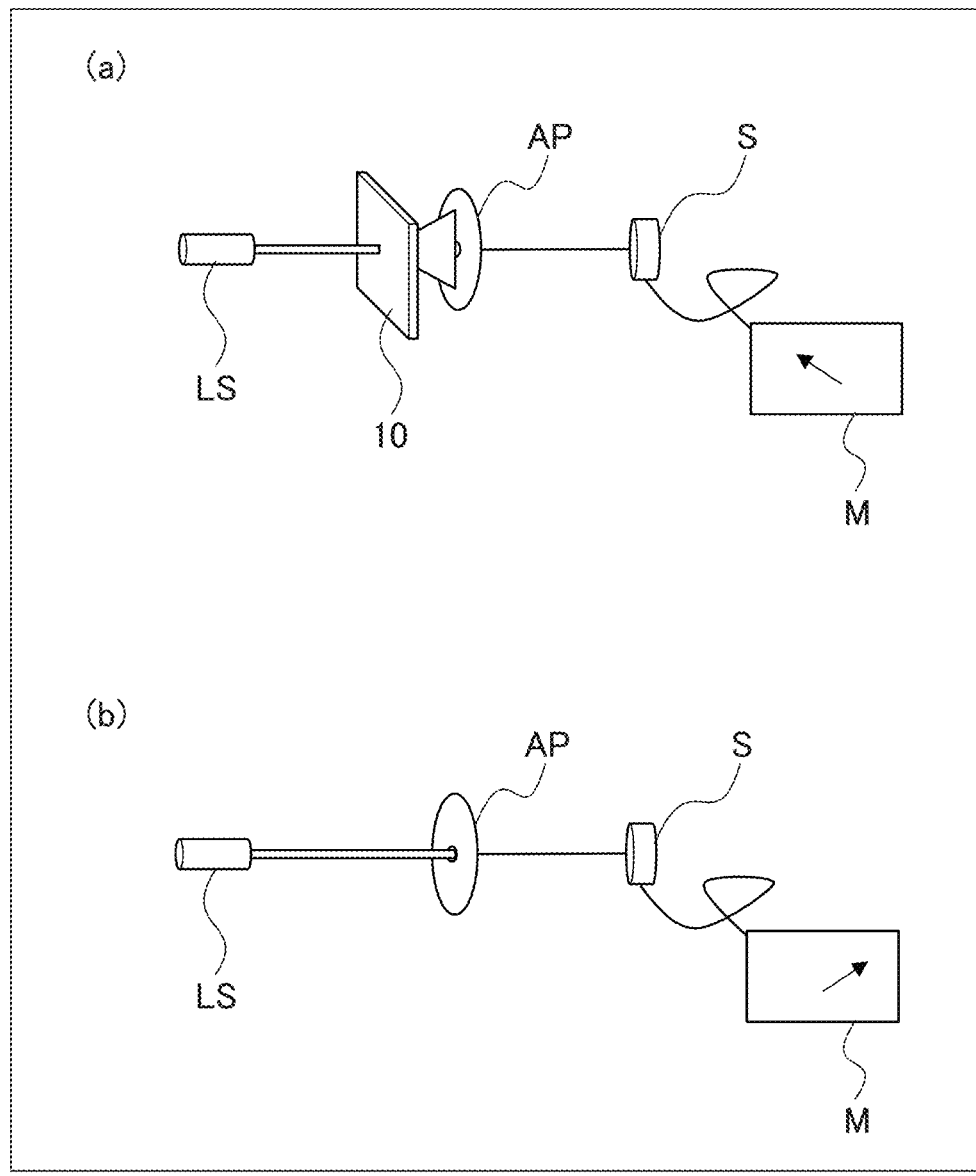
FIG. 11 is a diagram describing a method of measuring an intensity of zeroth-order diffraction light.

Next, the above-described embodiment and Comparative Example are actually produced, and the results of actually measuring the intensity of zeroth-order diffraction light are illustrated. FIG. 11 is a diagram describing a method of measuring the intensity of zeroth-order diffraction light. In order to measure the intensity of the zeroth-order diffraction light, first, as illustrated in FIG. 11(a), after the light having a specific wavelength emitted by the light source LS is projected on the diffractive optical element 10, only the light within a specific range through which the zeroth-order diffraction light passes by the aperture AP is allowed to reach the sensor S, and the power meter M measures the intensity when the diffractive optical element 10 is present. Next, as illustrated in FIG. 11(b), only the diffractive optical element 10 is removed from the state of FIG. 11(a), and the intensity in the case of the absence of the diffractive optical element 10 is measured. The intensity of the zeroth-order diffraction light can be determined by (intensity when the diffractive optical element 10 is present)/(intensity when the diffractive optical element 10 is absent). In addition, the light source LS used for measurement was set to two types of a laser light source and a halogen light source, and the wavelength was set to 850 nm.

The intensity of zeroth-order diffraction light was measured for the diffractive optical element 10 according to the present invention by the above method. In addition, as the diffractive optical elements 10 of the present invention, the diffractive optical elements having 4-level illustrated in FIGS. 3 and 5 and the diffractive optical element having 8-level illustrated in FIGS. 7 and 8 are measured. The 4-level product of the diffractive optical element 10 according to the present invention has a height h=470 nm per stage. This value corresponds to h=ht×1.106. In addition, C=0.1825 and f=−0.02 were set. In addition, since the pitch changes with portions as illustrated in FIGS. 1 and 6, various specifications are difficult. In addition, in the diffractive optical element 10 according to the present invention, the line connecting the stage portions is a concave curved line in the cross section.

Figure 12:
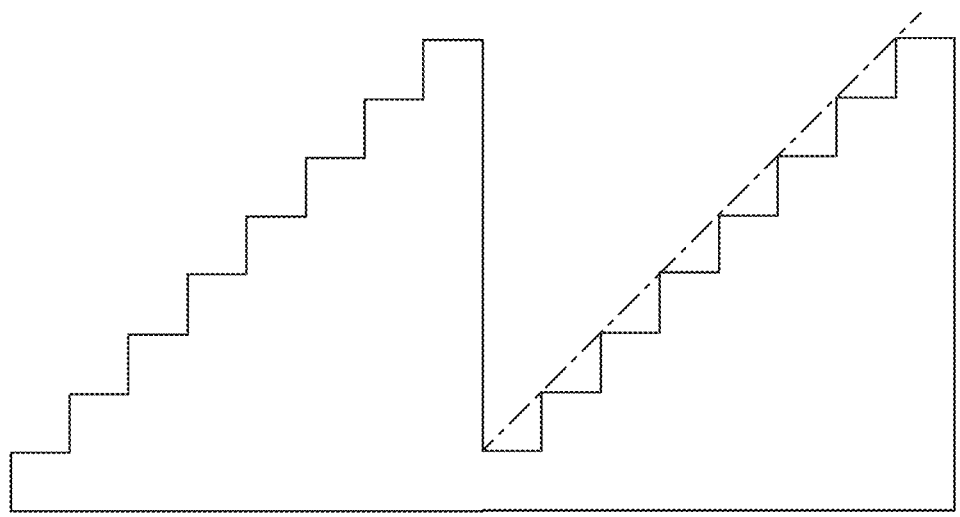
FIG. 12 is a diagram illustrating a diffractive optical element according to Comparative Example.
Figure 13:
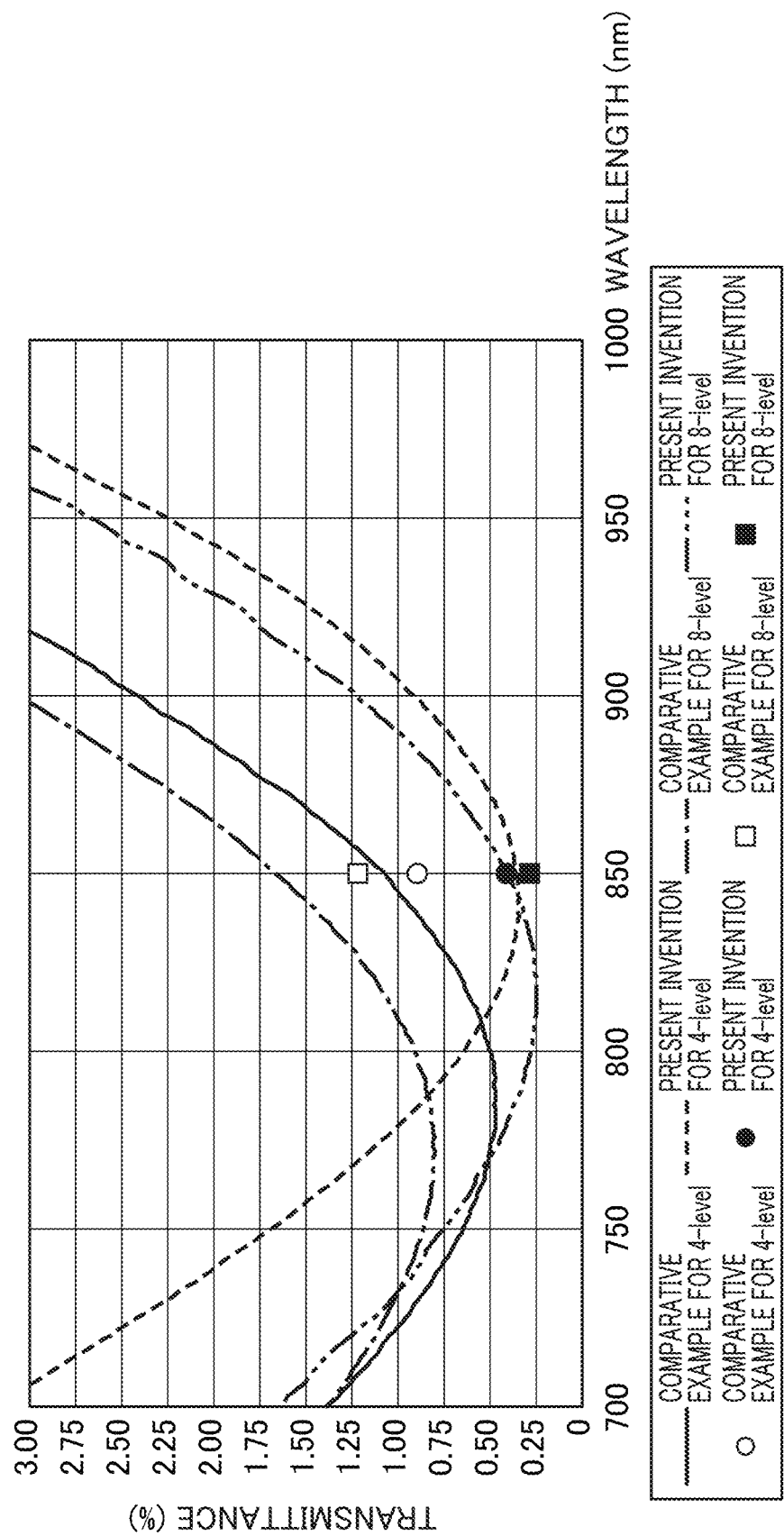
FIG. 13 is a diagram illustrating results of measuring the intensity of zeroth-order diffraction light for the diffractive optical element 10 according to the present invention and Comparative Example.

In addition, for comparison with the diffractive optical element 10 according to the present invention, 4-level products and 8-level products were also prepared as Comparative Examples. FIG. 12 is a diagram illustrating a diffractive optical element according to Comparative Example. As Comparative Example, as illustrated in FIG. 12, the line connecting the stage portions is a straight line in the cross section. Then, two types of 4-level and 8-level were also prepared as Comparative Examples. The height h per stage was the same as that of the product of the present invention. FIG. 13 is a diagram illustrating results of measuring the intensity of zeroth-order diffraction light for the diffractive optical element 10 according to the present invention and Comparative Example. In FIG. 13, data indicated by circles and squares represent data of a laser light source, and data indicated by curved lines represent data of a halogen light source. As illustrated in FIG. 13, the intensity of the zeroth-order diffraction light is greatly reduced in the present invention in comparison with Comparative Example, regardless of whether the light source is a laser light source or a halogen light source. Therefore, it has been proved in an actually measured product that the intensity of the zeroth-order diffraction light can be reduced by configuring the portion corresponding to the inclined plane having a sawtooth shape to be a concave curved plane.

Next, in order to investigate the effects of the present invention in more detail, simulations were performed. For the analysis simulation of the diffraction efficiency, calculation based on a rigorous coupled-wave analysis (RCWA) was used. Since the RCWA is mathematically reduced to solving matrix eigenvalue problems and linear formulas, there are no fundamental difficulties. In addition, a simulation result of an electromagnetic field analysis based on the RCWA and the reality basically coincide with each other except for the shape error and the like in the actual products. In addition, in this simulation, a three-dimensional shape as illustrated in FIG. 2A is not taken into consideration, but calculation was performed in an assumption that the depth direction is an infinite length in one dimension as illustrated in FIG. 2B.

Figure 14:
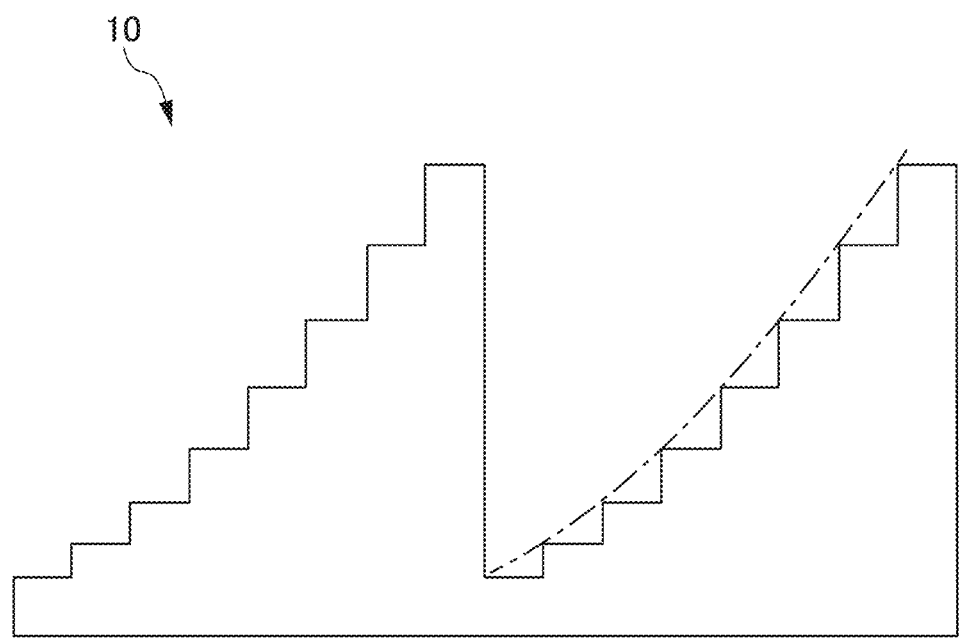
FIG. 14 is a diagram illustrating a shape of Example 2 in which a height per stage is changed.

The simulation was performed under the following conditions.
Wavelength: 850 nm
Refractive index n of high refractive index part: 1.5
Refractive index of low refractive index part: 1.0
Pitch: Two types of 2 μm and 4 μm
Number of levels: 8-level As a Comparative Example, first, Comparative Example 1 was configured by setting the height per stage to the height ht=212.5 nm which is the theoretical value. In addition, Comparative Example 2 was configured by setting the height per stage to the height h=ht×1.106=235 nm. The height h=ht×1.106=235 nm is the same as that used in the above-described actual measurement. In addition, two types were prepared as Examples of products of the present invention, in which the portion corresponding to the inclined plane is a concave curved plane. First, Example 1 was configured to have a form in which the width of the deep portion was sequentially increased similarly to the above-described actual measurement product. In addition, Example 2 was configured to have a form in which the portion corresponding to the inclined plane is a concave curved plane by sequentially reducing the height of the deep portion without changing the width. FIG. 14 is a diagram illustrating the shape of Example 2 in which the height per stage is changed. As described above, the concave curved plane can also be imitated by changing the height per stage as illustrated in FIG. 14.

FIG. 15 is a diagram summarizing the simulation results. In the simulation, values for the first-order diffraction light are also obtained as reference values. Also from the simulation results, it was obtained that the zeroth-order diffraction light can be greatly reduced if the portion corresponding to the inclined plane is a concave curved plane.

Figure 16:
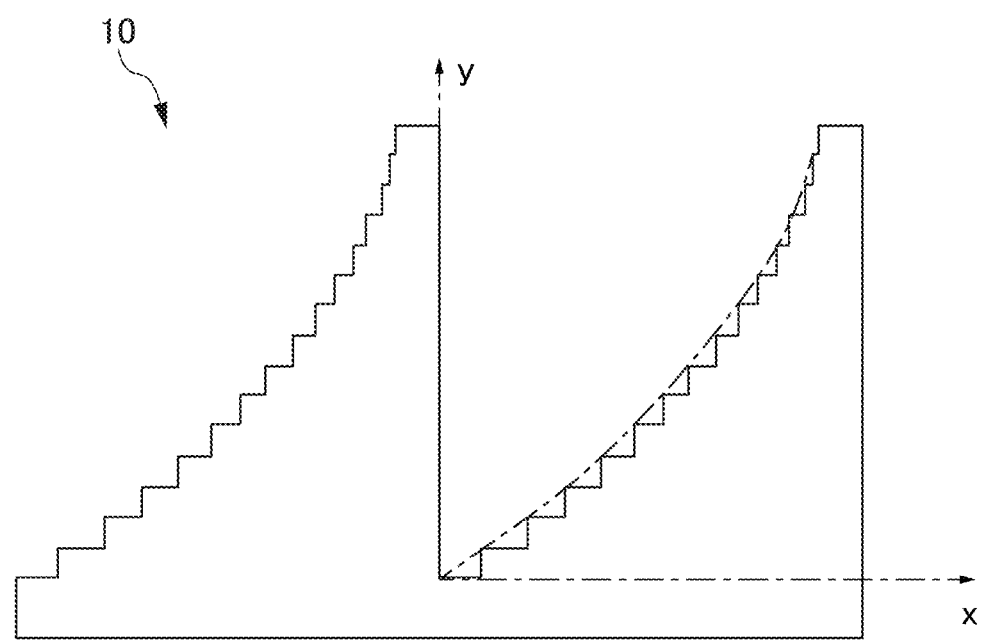
FIG. 16 is a diagram illustrating an example where a sawtooth shape is imitated by 16 stages.

In addition, the number of stages (number of levels) when the sawtooth shape is pseudo-reproduced by a multi-stage shape is not limited to the four or eight stages described above. FIG. 16 is a diagram illustrating an example where a sawtooth shape is imitated by 16 stages. In addition, if the number of stages is increased, the inclined plane can be made to be smoother. Therefore, the inclined plane can be regarded as substantially stepless, that is, the inclined plane can be regarded substantially as a curved plane. From the results of the above-described actual measurement and simulation, it can be said that the intensity of zeroth-order diffraction light can be reduced if the inclined plane is a concave curved plane, even in the case of a smooth inclined plane.

Next, simulation results for describing the influence of the width change rate C of level zero, the rate of decrease f of the width for each level, and the ratio t of the width of the uppermost level are illustrated.

(8-Level)

Figure 17:
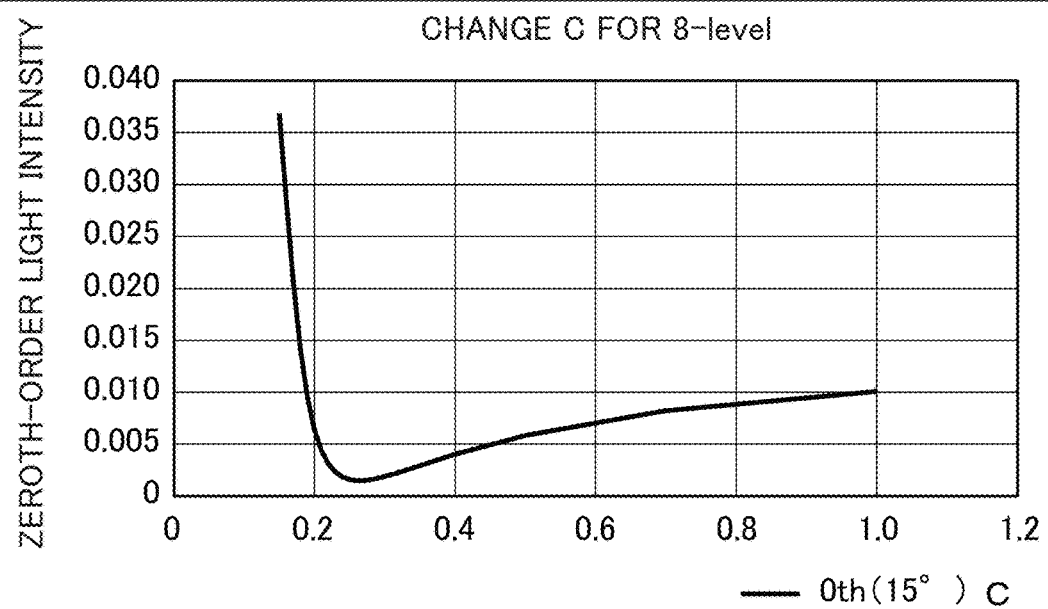
FIG. 17 is a graph of zeroth-order light intensity when C is changed with f=−0.02, t=0.8, and a pitch of 3284 nm at which the diffraction angle of the diffraction grating is 15° are set.
Figure 18:
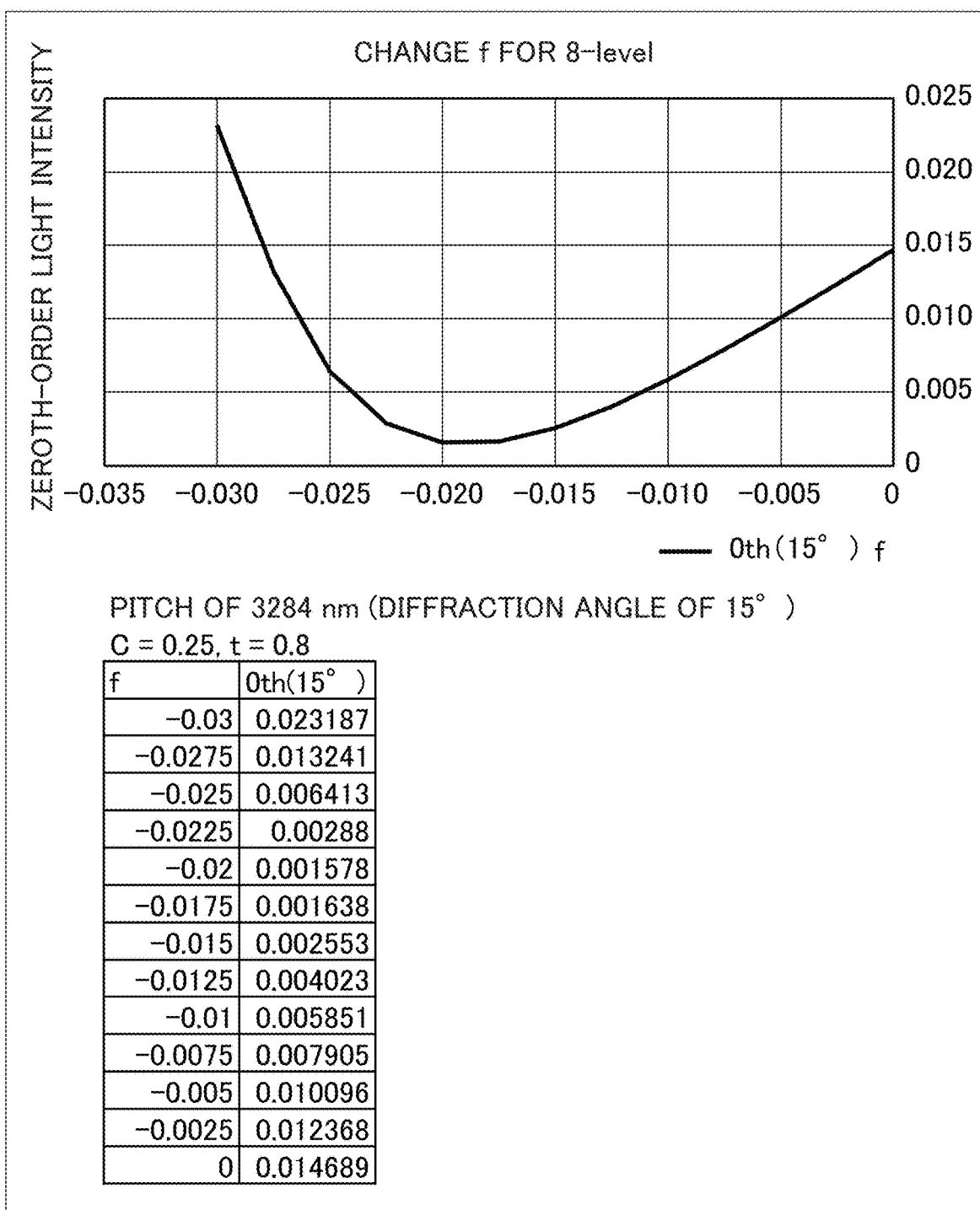
FIG. 18 is a graph of zeroth-order light intensity when f is changed when C=0.25, t=0.8, and the pitch of 3284 nm at which the diffraction angle of the diffraction grating is 15° are set.
Figure 19:
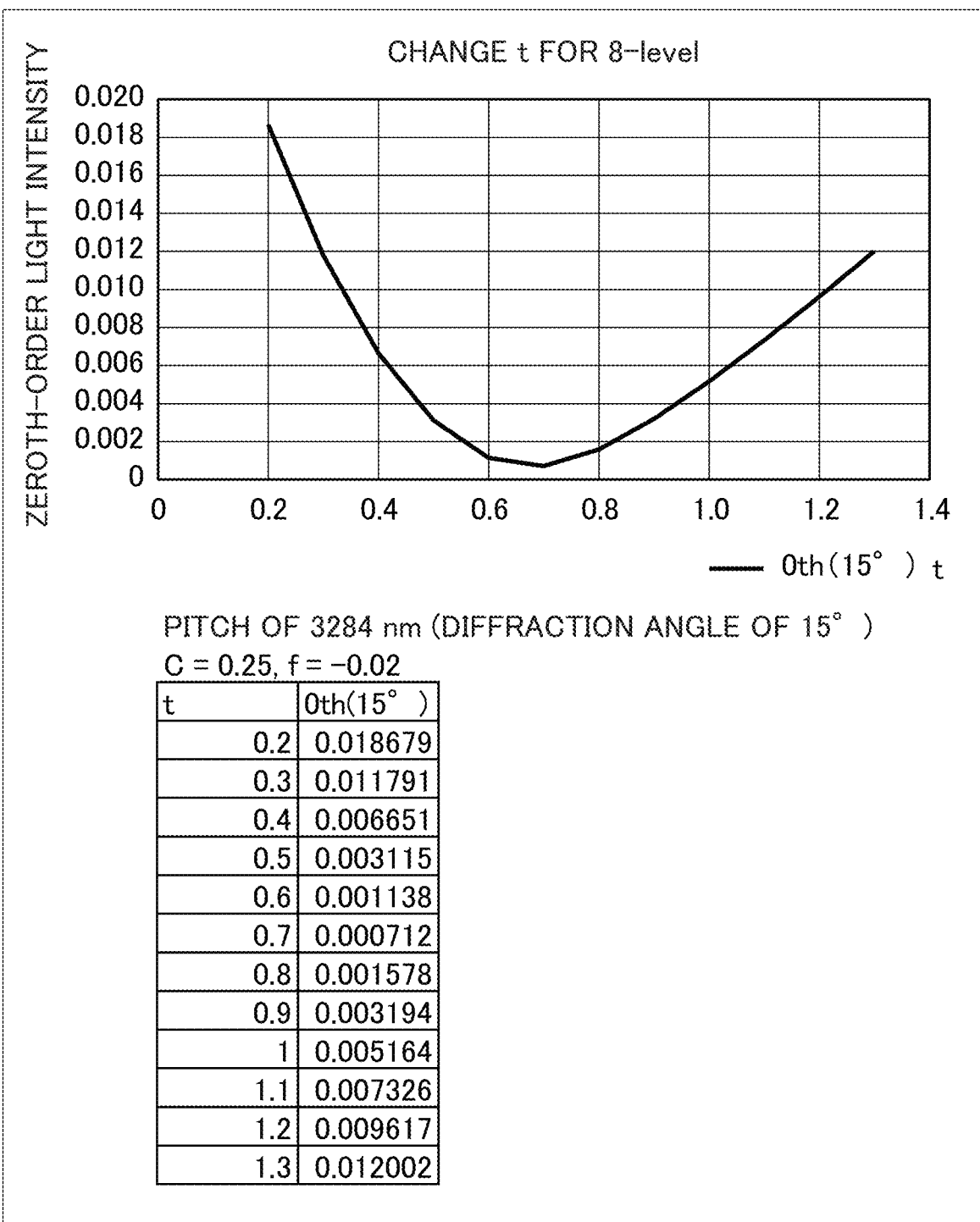
FIG. 19 is a graph of zeroth-order light intensity when t is changed when f=−0.02, C=0.25, and the pitch of 3284 nm at which the diffraction angle of the diffraction grating is 15° are set.

The results of simulating an 8-level structure expressed by the following formulas with a wavelength of 850 nm and a refractive index of 1.5 of the diffractive optical element are illustrated by FIGS. 17 to 19. The theoretical value is ht=212.5 nm, and thus, the height per stage is 223.125 nm, which is h=ht×1.1. t is the ratio of the width of the uppermost surface (level-7) to the width of the lowermost surface (level-0). As the formulas, the following formulas, which are the same as the formulas described above, are used. If the ratio of the x coordinate to a pitch is denoted by S and the followings are defined as:

$$x'=0.5 \times f \times lv^2 + C \times lv;$$

$$S=P/\{tw+\Sigma x'i\}; \text{ and}$$

$\Sigma$ is performed over i=0 to L−1,
the x and y coordinates of the vertexes of the step shape are expressed as follows.

$$x = S \times (0.5 \times f \times lv^2 + C \times lv)$$

$$y = lv \times h$$

FIG. 17 is a graph of zeroth-order light intensity when C is changed with f=−0.02 and t=0.8, and the pitch of 3284 nm at which the diffraction angle of the diffraction grating is 15° are set. It can be understood that, when 0.21≤C≤0.40, the zeroth-order light is low and is 0.5% or less. FIG. 18 is a graph of zeroth-order light intensity when f is changed when C=0.25, t=0.8, and the pitch of 3284 nm at which the diffraction angle of the diffraction grating is 15° are set. It can be understood that, when −0.0225≤f≤−0.0125, the zeroth-order light is low and is 0.5% or less. FIG. 19 is a graph of zeroth-order light intensity when t is changed when f=−0.02 and C=0.25, and the pitch of 3284 nm at which the diffraction angle of the diffraction grating is 15° are set. It can be understood that, when t is 0.5 to 0.9, the zeroth-order light is low and is 0.5% or less.

From these results, a suitable range of C/f at 8-level can be obtained. Herein, a range in which the zeroth-order light intensity is 1% or less is set as a suitable range of C/f. It can be understood from the results of FIG. 17 that, when 0.18<C, the zeroth-order light is 1% or less. In the example of FIG. 17, since f=−0.02, it is preferable to set C/f<−9. In addition, it can be understood from the results of FIG. 18 that, when −0.0275<f<−0.005, the zeroth-order light is 1% or less. In the example of FIG. 18, since C=0.25, it is preferable to set −50<C/f<−9. As a range common to these two ranges, a suitable range of C/f at 8-level is −50<C/f<−9.

(4-Level)

Figure 20:
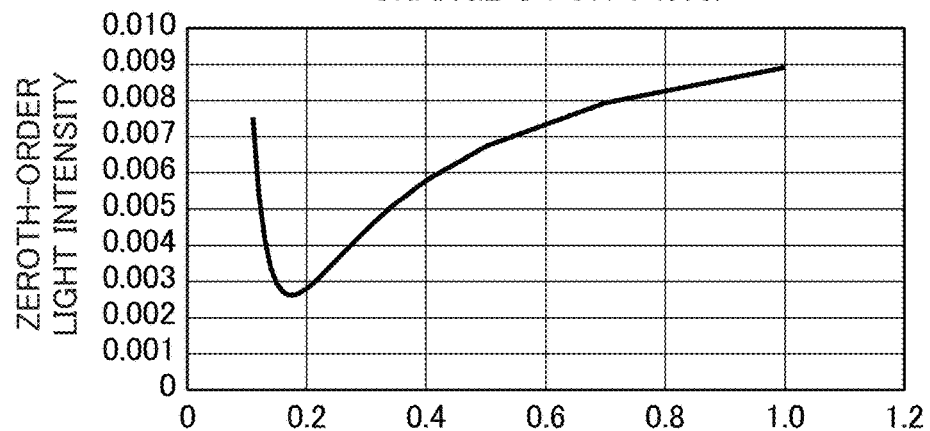
FIG. 20 is a graph of zeroth-order light intensity when C is changed when f=−0.02, t=0.8, and the pitch of 3284 nm at which the diffraction angle of the diffraction grating is 15° are set.
Figure 21:
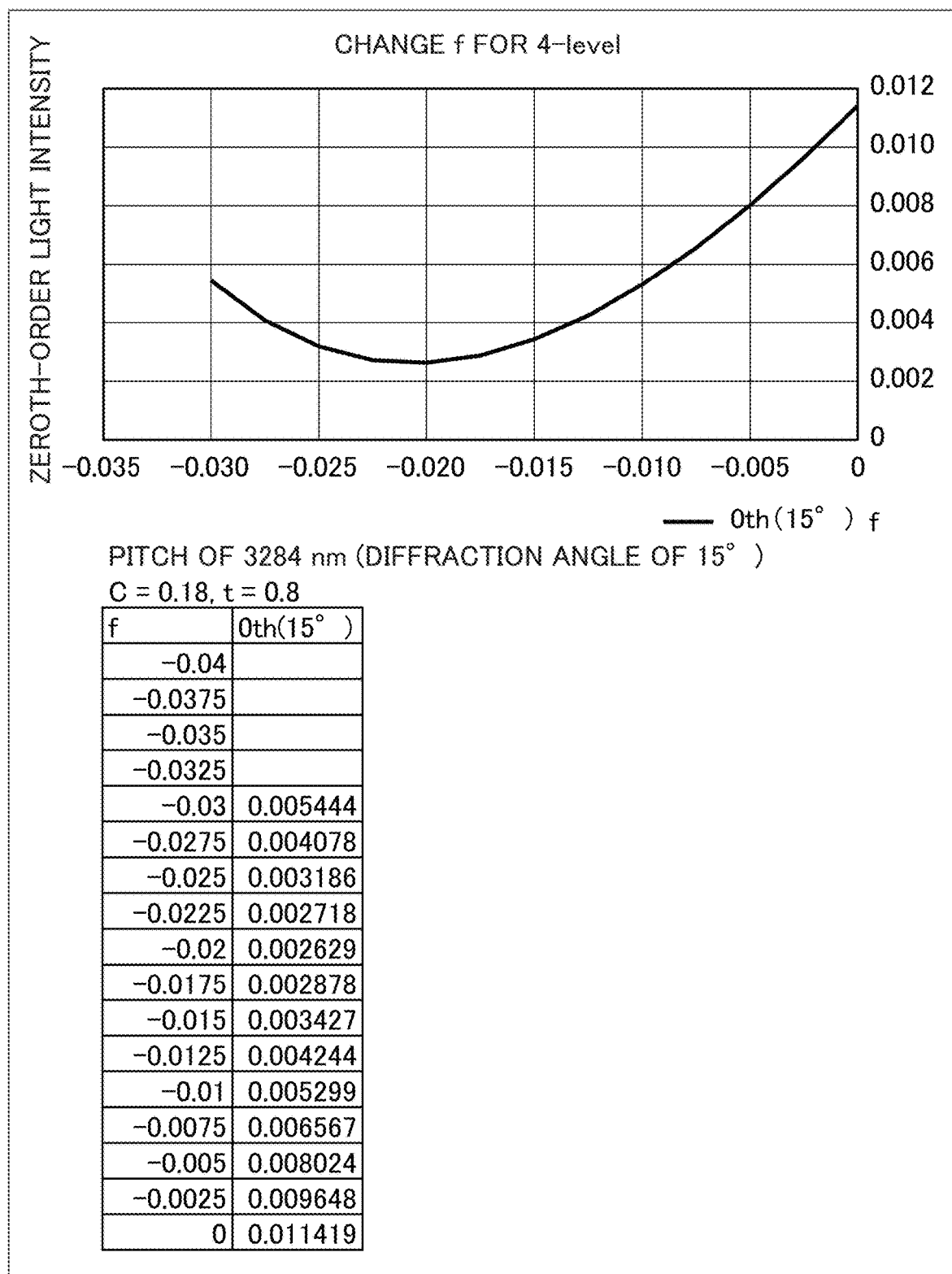
FIG. 21 is a graph of zeroth-order light intensity when f is changed when C=0.18, t=0.8, and the pitch of 3284 nm at which the diffraction angle of the diffraction grating is 15° are set.
Figure 22:
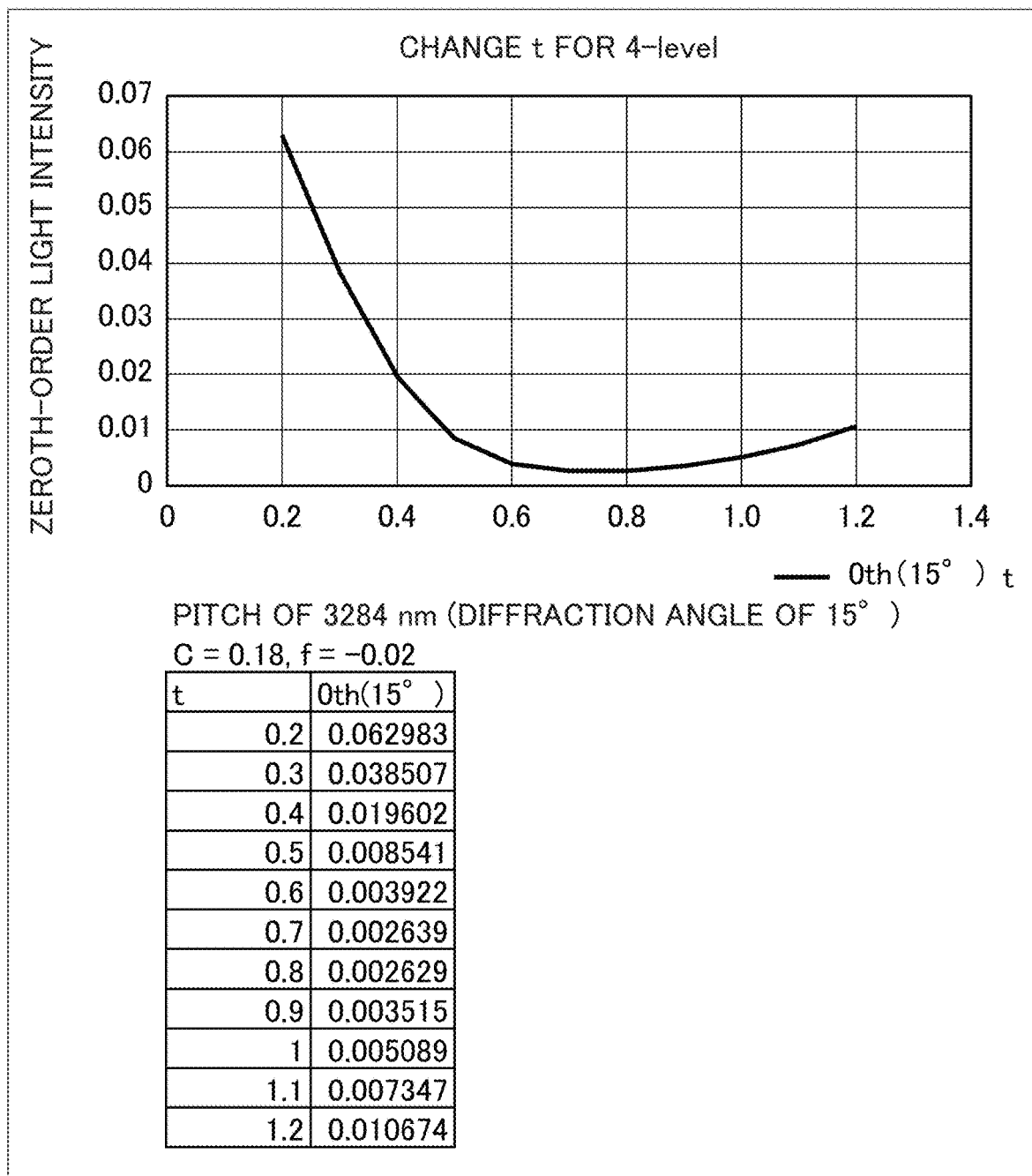
FIG. 22 is a graph of zeroth-order light intensity when t is changed when f=−0.02, C=0.18, and the pitch of 3284 nm at which the diffraction angle of the diffraction grating is 15° are set.

The results of simulating the 4-level structure expressed by the following formulas with a wavelength of 850 nm and a refractive index of 1.5 of the diffractive optical element are illustrated in FIGS. 20 to 22. The theoretical value is ht=425 nm, and thus, the height per stage is 467.5 nm, which is h=ht×1.1. t is the ratio of the width of the uppermost surface (level-3) to the width of the lowermost surface (level-0). As the formulas, the following formulas, which are the same as the formulas described above, are used. If the ratio of the x coordinate to a pitch is denoted by S and the followings are defined as:

$$x' = 0.5 \times f \times lv^2 + C \times lv;$$

$$S = P/\{tw + \Sigma x'i\}; \text{ and}$$

$\Sigma$ is performed over i=0 to L−1, the x and y coordinates of the vertexes of the step shape are expressed as follows.

$$x = S \times (0.5 \times f \times lv^2 + C \times lv)$$

$$y = lv \times h$$

FIG. 20 is a graph of zeroth-order light intensity when C is changed when f=−0.02 and t=0.8, and the pitch of 3284 nm at which the diffraction angle of the diffraction grating is 15° are set. It can be understood that, when 0.13≤C≤0.33, the zeroth-order light is low and is 0.5% or less. FIG. 21 is a graph of zeroth-order light intensity when f is changed when C=0.18 and t=0.8, and the pitch of 3284 nm at which the diffraction angle of the diffraction grating is 15° are set. It can be understood that, when −0.0275≤f≤−0.0125, the zeroth-order light is low and is 0.5% or less. FIG. 22 is a graph of zeroth-order light intensity when t is changed when f=−0.02, C=0.18, and the pitch of 3284 nm at which the diffraction angle of the diffraction grating is 15° are set. It can be understood that, when t is 0.3 to 0.9, the zeroth-order light is low and is 0.5% or less.

From these results, the suitable range of C/f for the 4-level can be obtained. Herein, the range in which the zeroth-order light intensity is 1% or less is set as a suitable range of C/f. It can be understood from the results of FIG. 20 that, when 0.1<C, the zeroth-order light is 1% or less. In the example of FIG. 20, since f=−0.02, it is preferable to set −5<C/f. In addition, it can be understood from the results of FIG. 21 that, when f<0, the zeroth-order light is 1% or less. In the example of FIG. 21, since C=0.18, the range of C/f cannot be obtained from the condition of f<0, and any value may be obtained under this condition. As a range common to these two ranges, a suitable range of C/f for the 4-level is −5<C/f.

As mentioned above, the suitable range of C/f for the 8-level is −50<C/f<−9, and the suitable range of C/f for the 4-level is −5<C/f. Therefore, as a range common to these, −5<C/f<−9 can be set as a suitable range of C/f. Herein, focusing on the rate of decrease f, the rate of decrease f has an inverse relationship with C/f. Therefore, when the above range is rewritten so that the rate of decrease f becomes a numerator, it is preferable that the range is −0.2<f/C<−0.1. The rate of decrease f is a rate of decrease in width for each level and is a dimensionless value, and if C is constant, it is considered to be preferable that the rate of change in area is also in the above range. Therefore, it is preferable that the rate of decrease at which the area of each stage portion decreases is in the range of −5% to −20%.

In addition, in FIG. 19 for the 8-level, t is preferably 0.5 to 0.9, and in FIG. 22 for the 4-level, t is preferably 0.3 to 0.9. t is the ratio of the width of the uppermost surface (level-3) to the width of the lowermost surface (level-0). Therefore, it can be said that the area of the uppermost surface of the high refractive index part is preferably 0.5 to 0.9 times the area of the lowermost surface of the high refractive index part.

Figure 23:
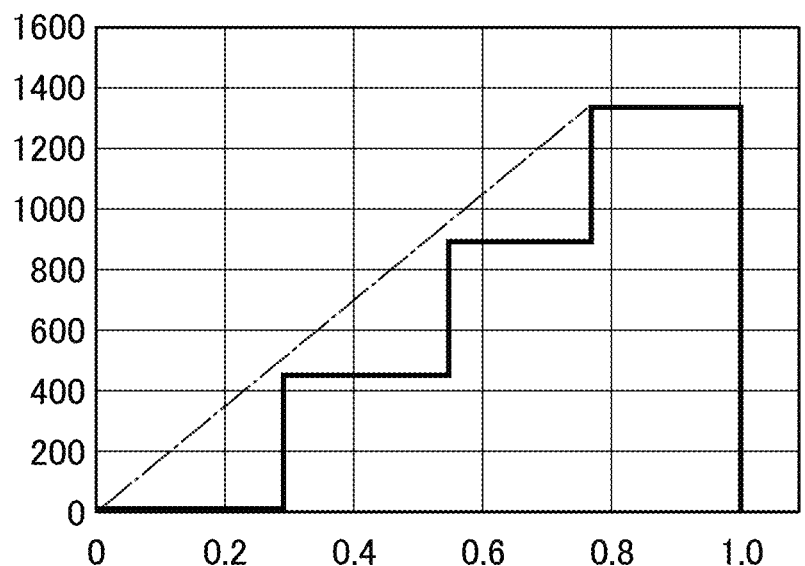
FIG. 23 is a diagram illustrating a cross-sectional shape of a diffractive optical element having a configuration in which a locus connecting vertexes of the present invention is a concave curved plane and a simulation result.
Figure 24:
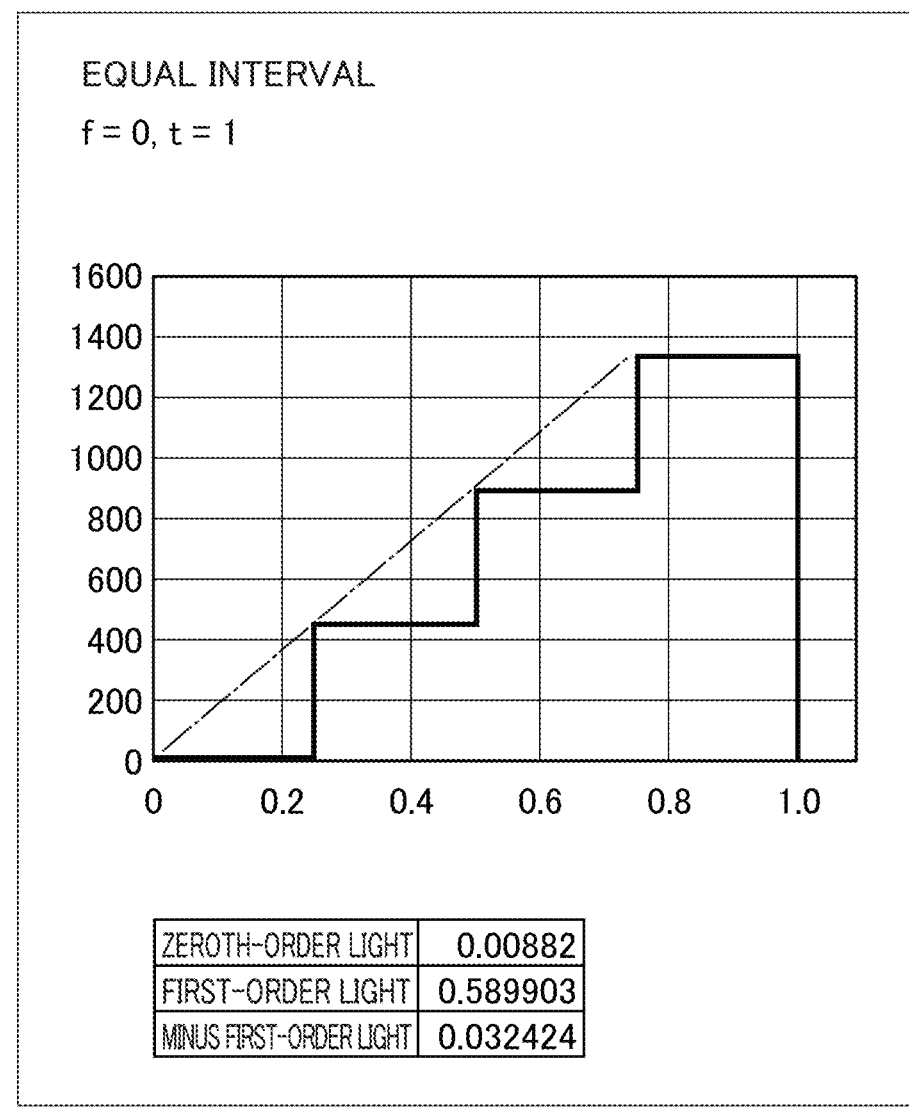
FIG. 24 is a diagram illustrating a cross-sectional shape of a diffractive optical element having a configuration as a theoretical structure in which vertexes are linearly aligned and a simulation result.
Figure 25:
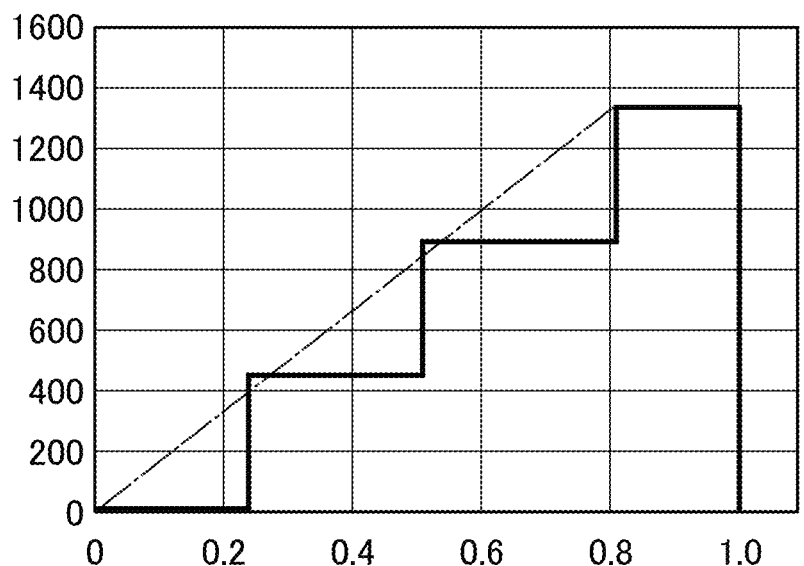
FIG. 25 is a diagram illustrating a cross-sectional shape of a diffractive optical element having a configuration in which a locus connecting vertexes is a convex curved plane on the contrary to the present invention and a simulation result.

Next, the results of the simulation comparing the diffractive optical element according to the present invention having a configuration in which a locus connecting vertexes is a concave curved plane, the diffractive optical element having a configuration in which vertexes are linearly arranged in a theoretical structure, and the diffractive optical element having a configuration in which the locus connecting the vertexes is convex curved plane on the contrary to the present invention are illustrated in FIGS. 23 to 25. In the simulations of FIGS. 23 to 25, f=−0.02, C=0.18, t=0.8, and 3248 nm pitch (diffraction angle 15°) were set. FIG. 23 is a diagram illustrating a cross-sectional shape of a diffractive optical element having a configuration in which a locus connecting vertexes of the present invention is a concave curved plane and a simulation result. In addition, in FIGS. 23 to 25, straight lines are indicated by dot-dashed lines so that differences in cross-sectional shape can be easily understood. As illustrated in FIG. 23, in the structure according to the present invention, the zeroth-order light is 0.26%. FIG. 24 is a diagram illustrating a cross-sectional shape of a diffractive optical element having a configuration as a theoretical structure in which vertexes are linearly aligned and a simulation result. As illustrated in FIG. 24, in a case where all the stages are the same, which is a theoretical structure, the zeroth-order light is 0.88%. FIG. 25 is a diagram illustrating a cross-sectional shape of a diffractive optical element having a configuration in which a locus connecting vertexes is a convex curved plane on the contrary to the present invention and a simulation result. As illustrated in FIG. 25, in a structure which is convex with respect to the inclined plane having a sawtooth shape on the contrary to the present invention, the zeroth-order light is 2.90%. It can be confirmed from the results of FIG. 23 to FIG. 25 that the zeroth-order light can be reduced in the diffractive optical element having the configuration in which the locus connecting vertexes is a concave curved plane as in the present invention.

Figure 26:
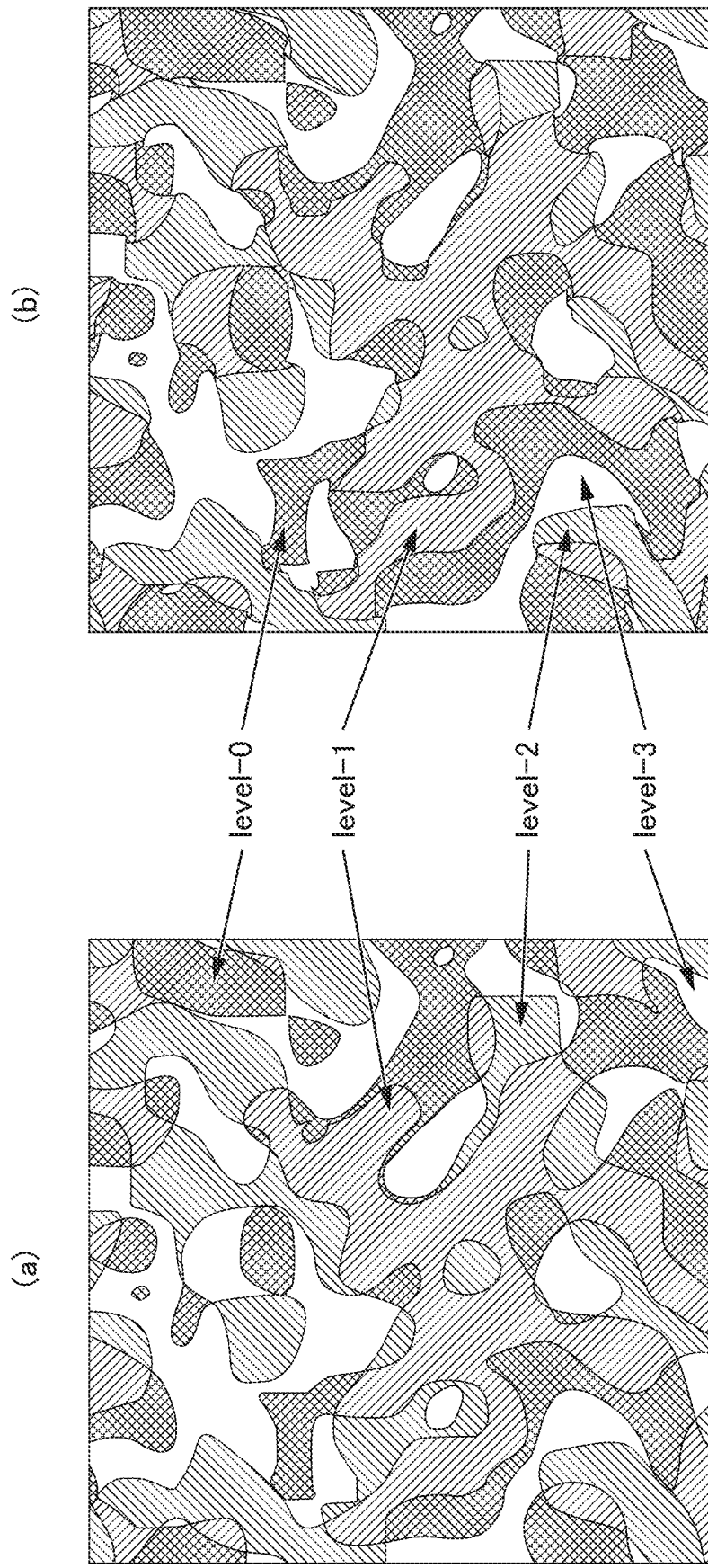
FIG. 26 is a plan view illustrating a diffractive optical element having a structure in the related art and a diffractive optical element according to the present invention side by side for comparison.
Figure 27A:
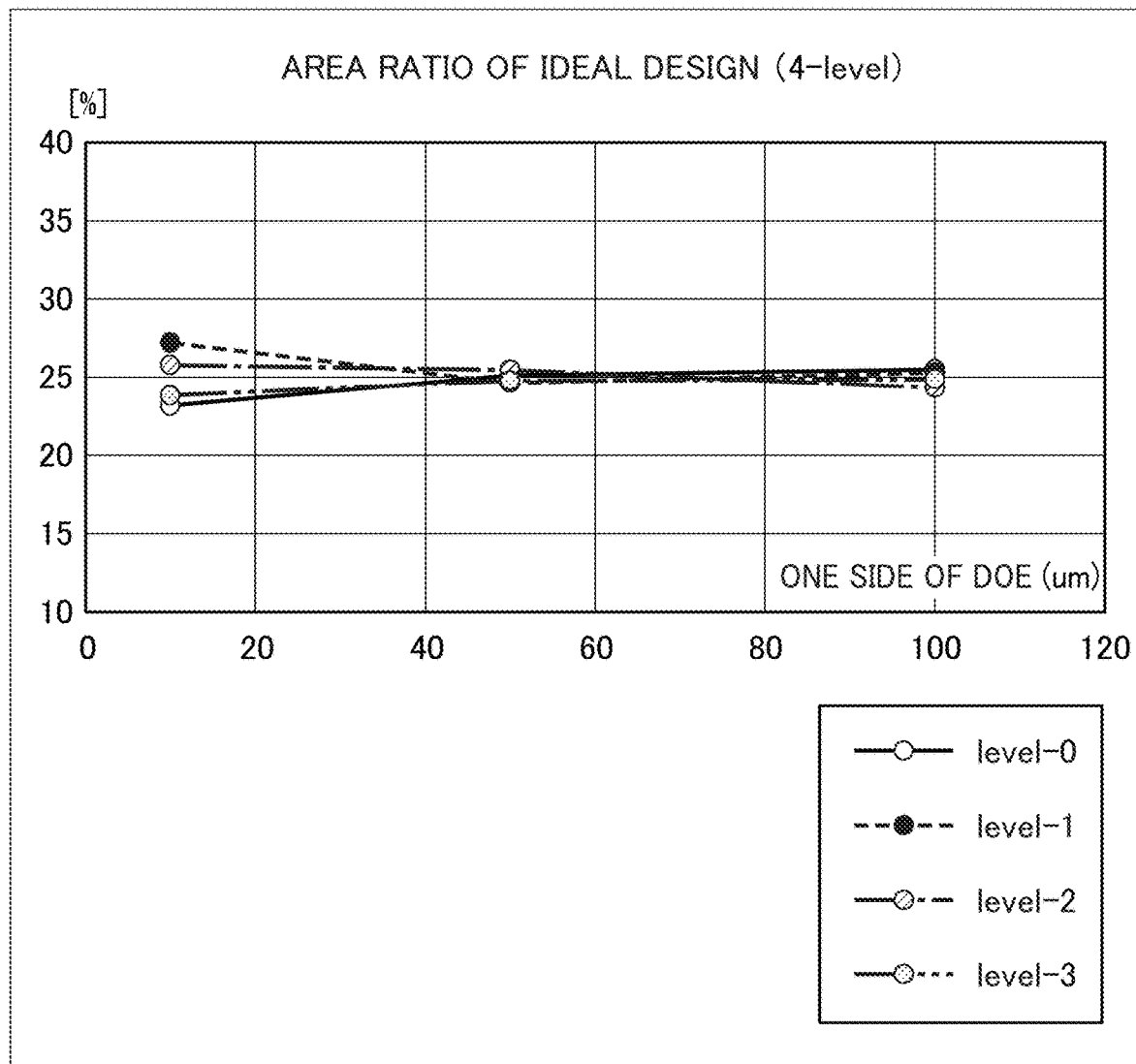
FIG. 27A is a diagram illustrating the ratio of each surface illustrated in FIG. 26 to the area of the 4-level diffractive optical element according to the ideal design in the related art of FIG. 26(*a*).
Figure 27B:
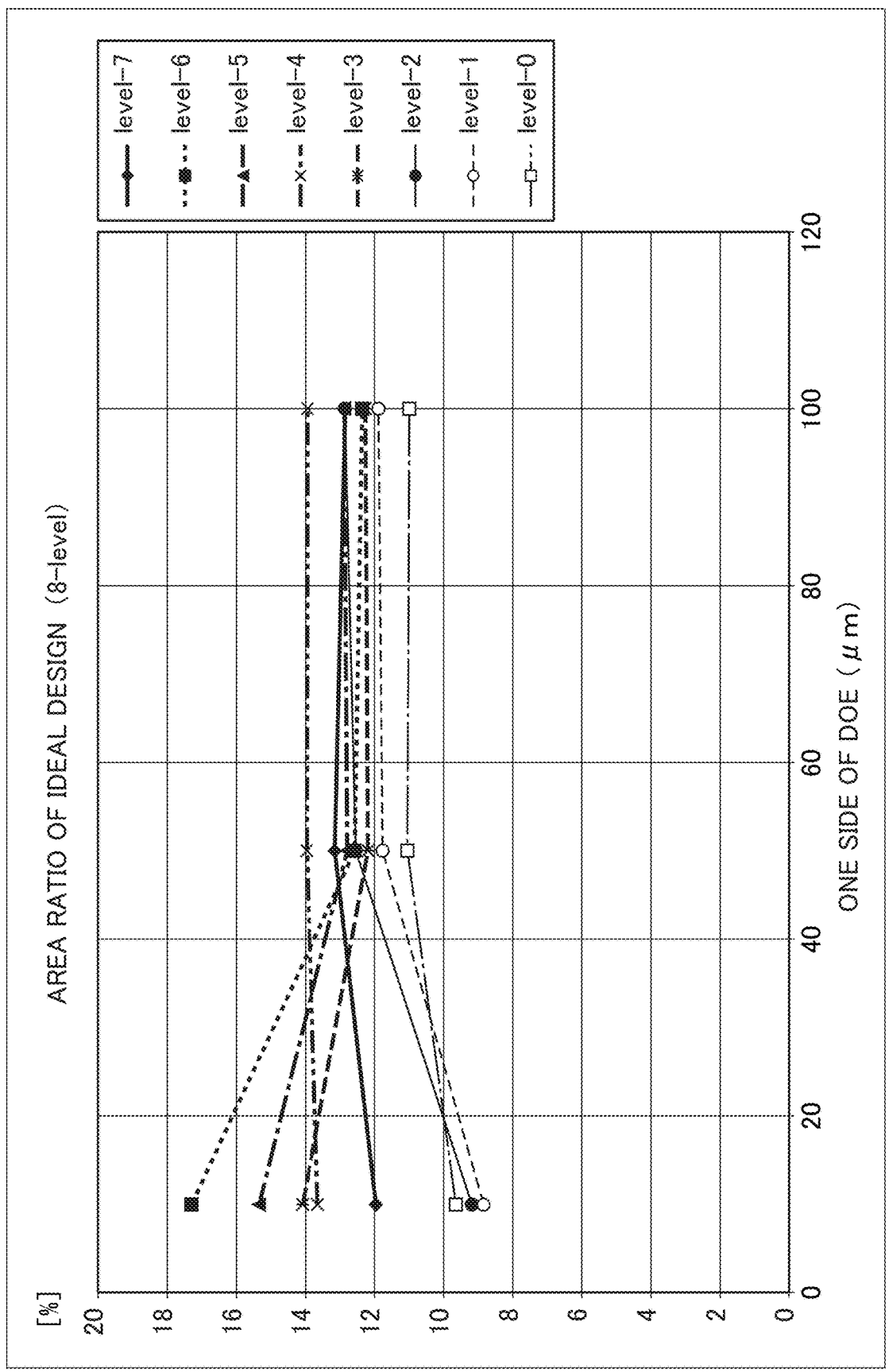
FIG. 27B is a diagram illustrating the ratio of each surface to the area of the 8-level diffractive optical element according to the ideal design in the related art.
Figure 28A:
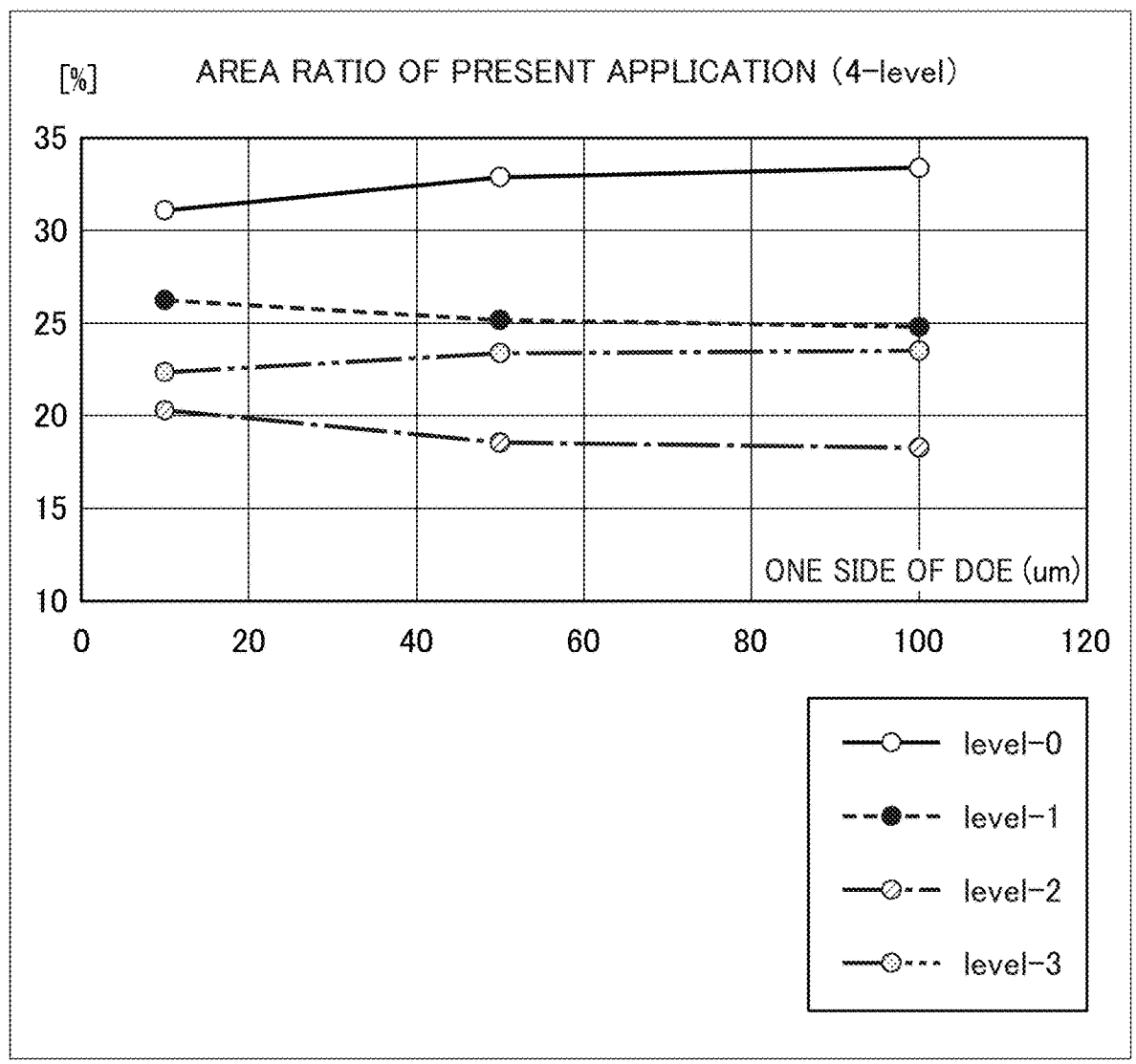
FIG. 28A is a diagram illustrating the ratio of each surface illustrated in FIG. 26 to the area of the 4-level diffractive optical element according to the present invention of FIG. 26(*b*).
Figure 29:
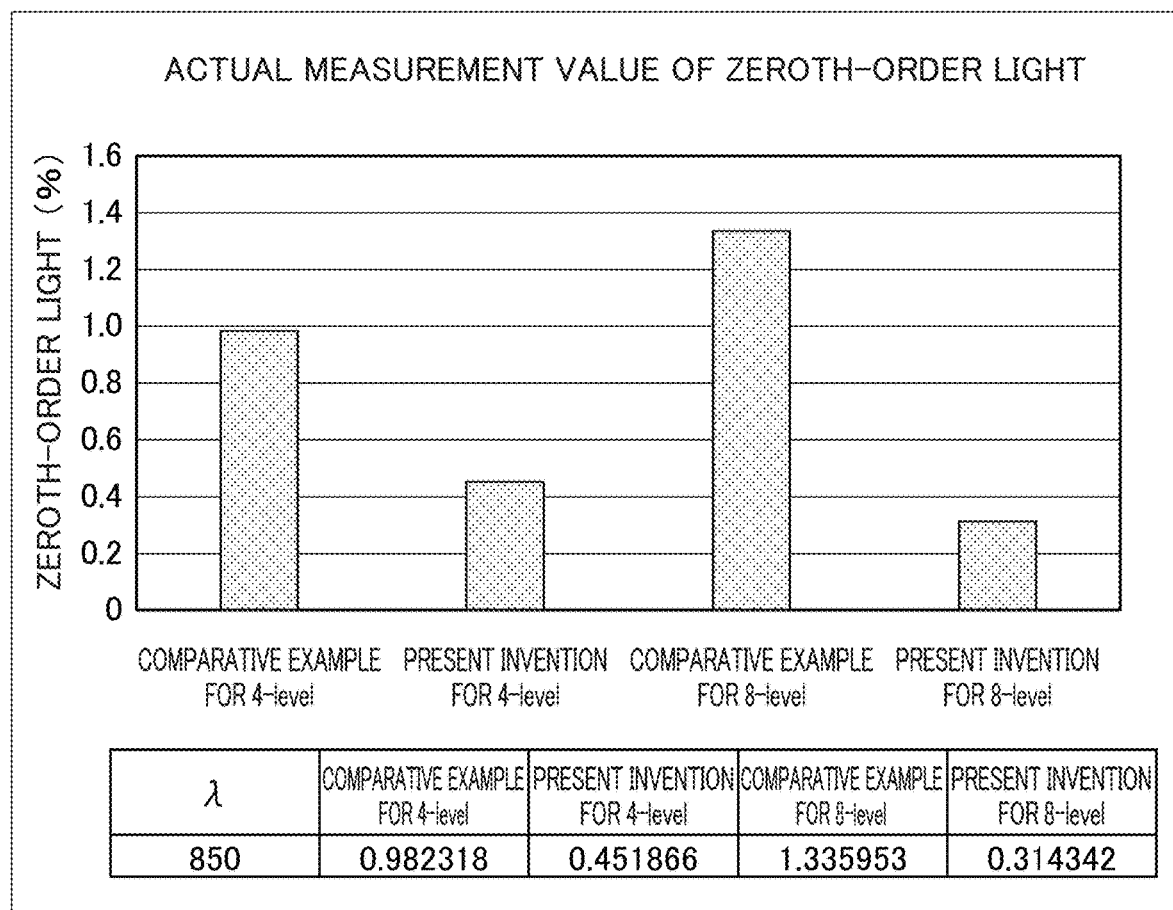
FIG. 29 illustrates results of actual measurement values of zeroth-order light measured by actually manufacturing a diffractive optical element on the basis of data of FIGS. 26(*a*) and 26(*b*).

Next, instead of the method of confirming the concave curved plane by the above-mentioned mathematical formulas, a method which can more easily compare the structure of the present invention with the structure in the related art will be described. In the configuration of the present invention, since the locus connecting vertexes is a concave curved plane, the area of the upper surface of each stage differs depending on the stage. The description focusing on this point will be made below. FIG. 26 is a plan view illustrating the diffractive optical element having a structure in the related art and the diffractive optical element according to the present invention side by side for comparison. FIG. 26(a) illustrates 4-level surfaces of a diffractive optical element in the related art, which is designed by a method known as an ideal design, and is data illustrating 1 to 4 surfaces. FIG. 26(b) is an improvement of the shape of FIG. 26(a) on the basis of the structure of the present invention. The individual planes are illustrated in the figure with the lowermost surface (level-0 stage portion 11a-0: refer to FIG. 3) as the 0-plane and the uppermost surface (level-3 stage portion 11a-3) as the 3-plane. FIG. 27A is a diagram illustrating the ratio of each surface illustrated in FIG. 26 to the area of the 4-level diffractive optical element according to the ideal design in the related art of FIG. 26(a). FIG. 27B is a diagram illustrating the ratio of each surface to the area of the 8-level diffractive optical element according to the ideal design in the related art. FIG. 28A is a diagram illustrating the ratio of each surface illustrated in FIG. 26 to the area of the 4-level diffractive optical element according to the present invention in FIG. 26(b). FIG. 28B is a diagram illustrating the ratio of each surface to the area of the 8-level diffractive optical element according to the present invention. FIGS. 27A and 27B and FIGS. 28A and 28B, the area ratio was obtained for a square area of 10 µm, 50 µm, and 100 µm on one side of the diffractive optical element (DOE). As the size of the square area is larger, the number of surfaces to be sampled is increased, and thus, there is a tendency to converge to a constant value. As can be seen from FIGS. 27A and 27B, the ratio of each surface in the ideal design in the related art is approximately 25% for each surface of the 4-level and is 11 to 14% for each surface of the 8-level, and thus, it can be understood that the ratio is approximately equal. On the other hand, as can be seen from FIGS. 28A and 28B, in the structure according to the present invention, the area of level-0 which is the lowermost surface has the largest area, and the next surface (level-2, level-6) of the uppermost surface has the smallest area. FIG. 29 illustrates results of actual measurement values of the zeroth-order light measured by actually manufacturing the diffractive optical element on the basis of the data of FIGS. 26(a) and 26(b). In addition, in FIG. 29, the actual measurement values of the 4-level and the 8-level are illustrated together. As can be seen from FIG. 29, it can be understood that, at both the 4-level and the 8-level, the zeroth-order light in the structure according to the present invention is smaller than that in the form in the related art.

In the example of FIG. 28A described above, when arranged in the descending order of area, the order is level-0, level-1, level-3, and level-2 (hereinafter referred to as type 1). In the following, in addition, the order of level-0, level-3, level-1, and level-2 (hereinafter referred to as type 2) in the descending order of area is exemplified, and the form of the ideal design that is the basis of these is further compared under the same conditions. In addition, in this comparison, the difference in height from level-0 to level-3, that is, the depth of concavo-convex (hereinafter also referred to as a DOE height) is changed, and the influence of DOE height is also examined. In addition, the DOE height is usually determined according to the wavelength of light to be diffracted.

Figure 31:
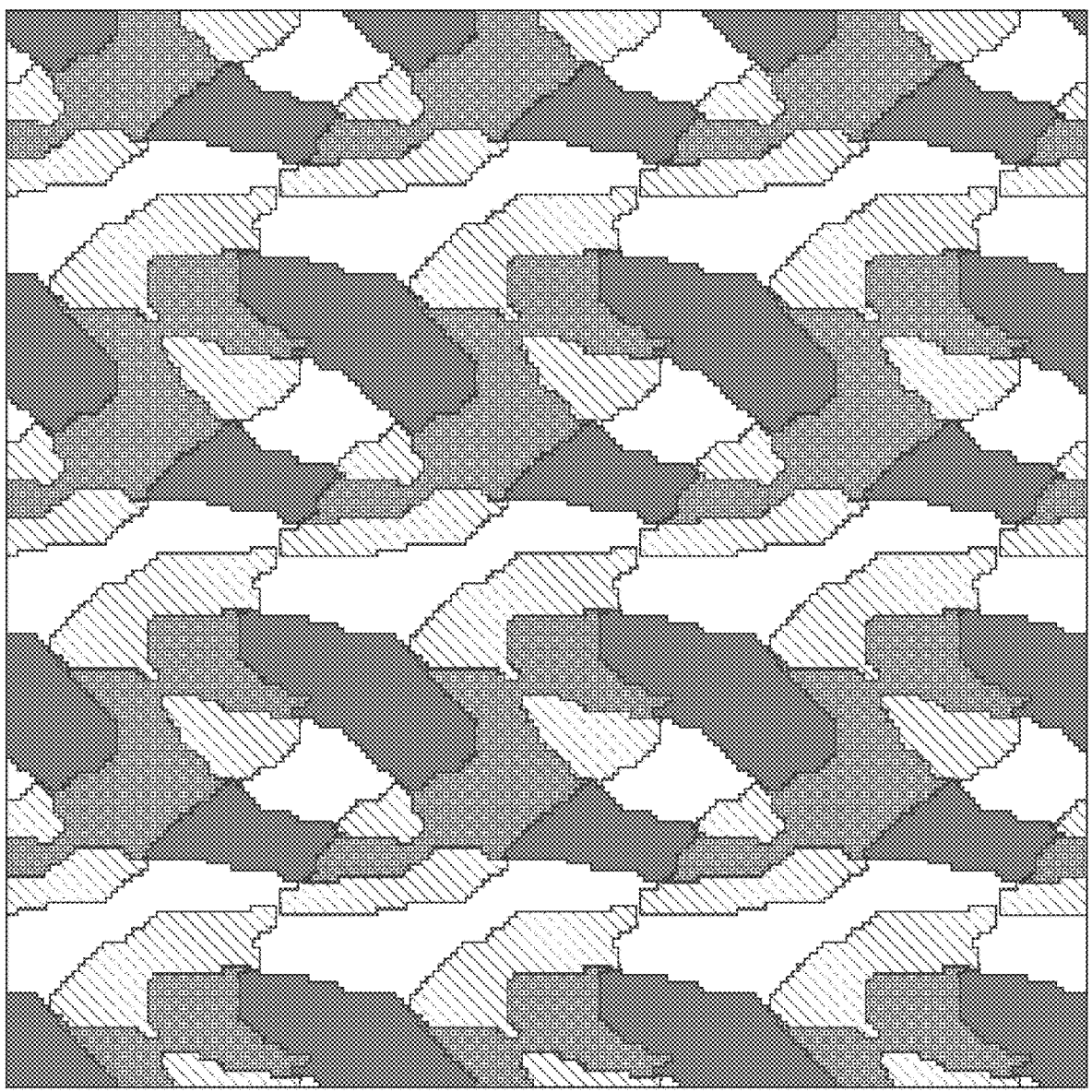
FIG. 31 is a diagram of a diffractive optical element of an ideal design as viewed from the normal direction of the sheet surface.
Figure 32:
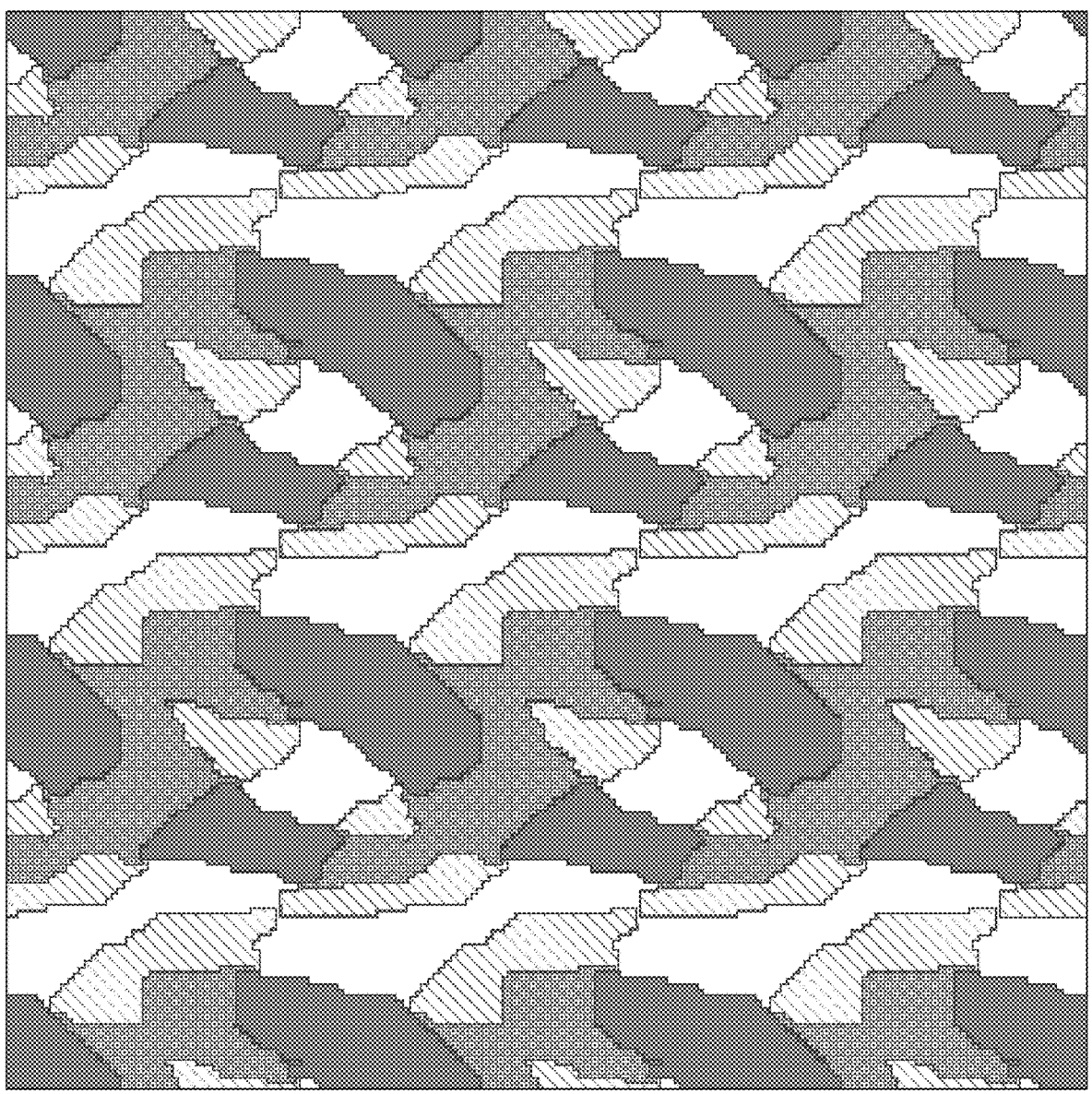
FIG. 32 is a diagram of a diffractive optical element of type 1 as viewed from the normal direction of the sheet surface.
Figure 33:
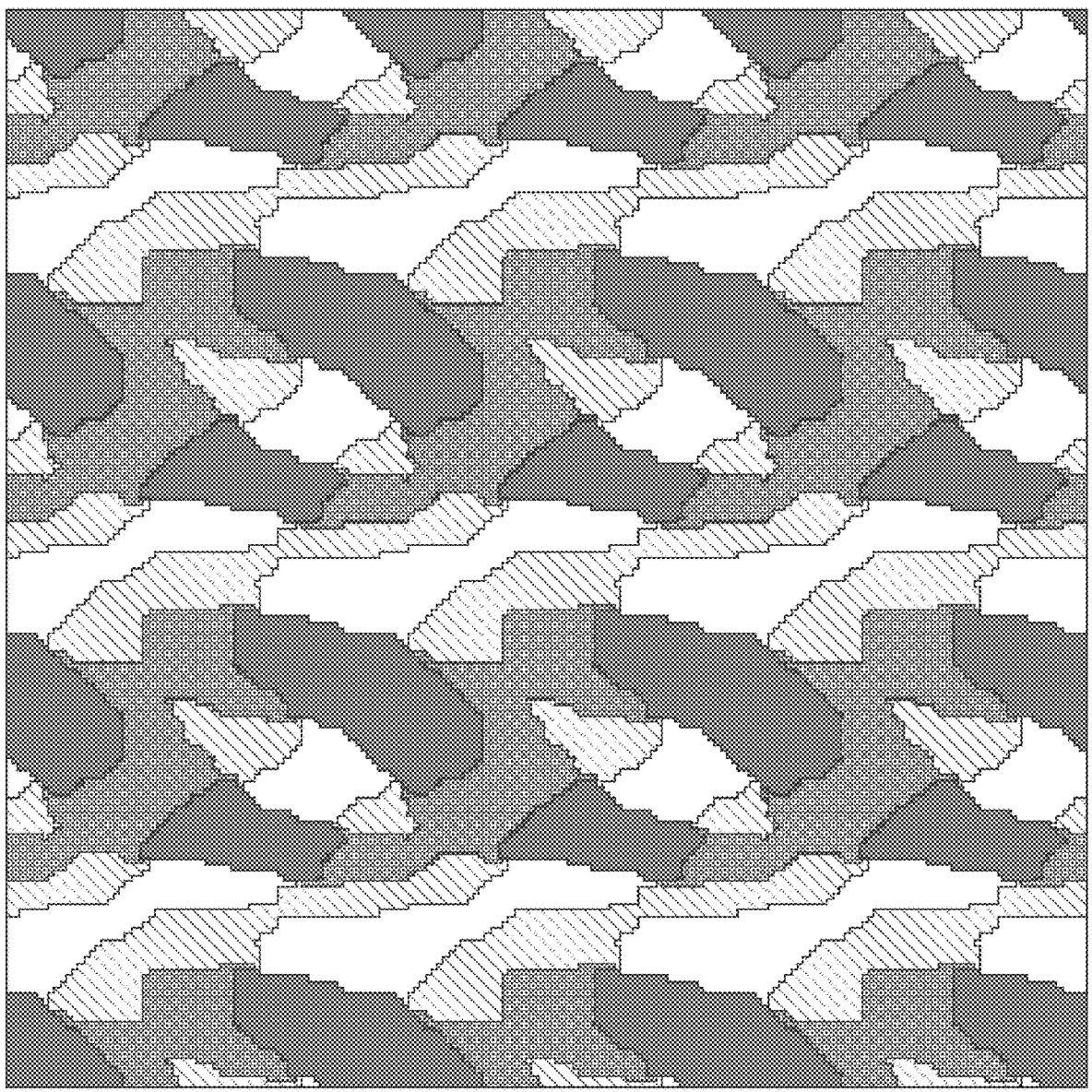
FIG. 33 is a diagram of a diffractive optical element of type 2 as viewed from the normal direction of the sheet surface.
Figure 35:
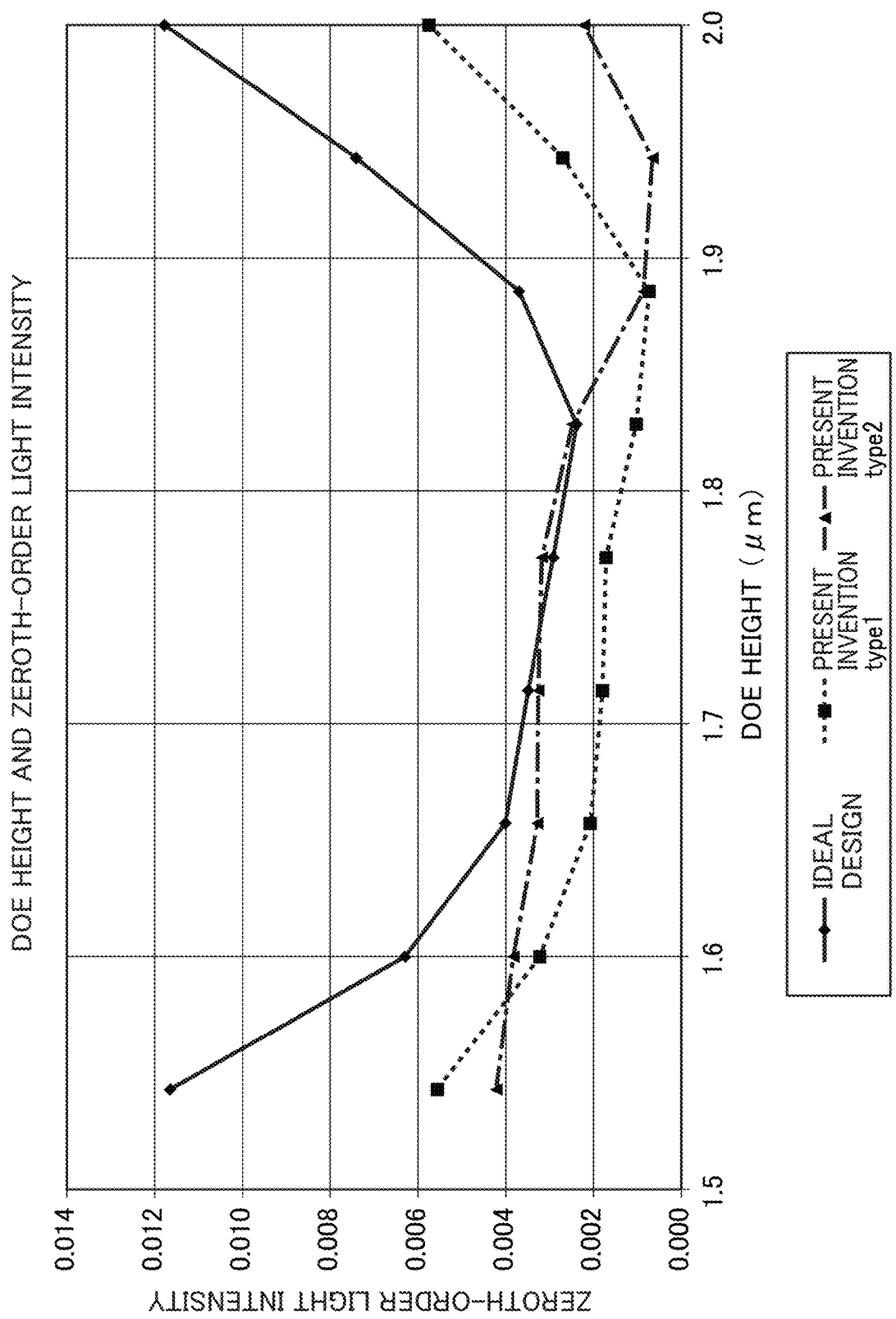
FIG. 35 is a diagram illustrating the simulation results of the three types of diffractive optical elements by a graph.

FIG. 30 is a diagram illustrating the area ratio of the three types of diffractive optical elements. FIG. 31 is a diagram of a diffractive optical element of an ideal design as viewed from the normal direction of the sheet surface. FIG. 32 is a diagram of the diffractive optical element of type 1 as viewed from the normal direction of the sheet surface. FIG. 33 is a diagram of the diffractive optical element of type 2 as viewed from the normal direction of the sheet surface. FIG. 34 is diagram illustrating simulation results of the three types of diffractive optical elements by numerical values. FIG. 35 is a diagram illustrating the simulation results of the three types of diffractive optical elements by a graph. In addition, the simulations in FIGS. 34 and 35 were performed by using a rigorous coupled-wave analysis (RCWA) at a wavelength of 850 nm. As can be seen from FIGS. 34 and 35, with respect to the zeroth-order light intensity of the ideal design, the zeroth-order light intensity in type 1 of the present invention is small even when the DOE height is changed. In addition, type 2 has a portion where the zeroth-order light intensity is small relative to the ideal design, depending on the DOE height.

In the above description, the description is mainly made on the basis of the simulation results. However, in a case where the diffractive optical element is actually manufactured, it is necessary to obtain the area ratio of each stage from the complicated concavo-convex shape of the actual product. In order to obtain the area ratio, the area of each stage is to be obtained. However, in many cases, the diffractive optical element to be produced is provided with fine, complicated concavo-convex shape, and thus, it is not easy to simply obtain the area. Therefore, one example of a method of obtaining the area ratio relatively easily is illustrated below. In addition, as the method of obtaining the area ratio, any method except for the method illustrated below may be used.

Figure 36:
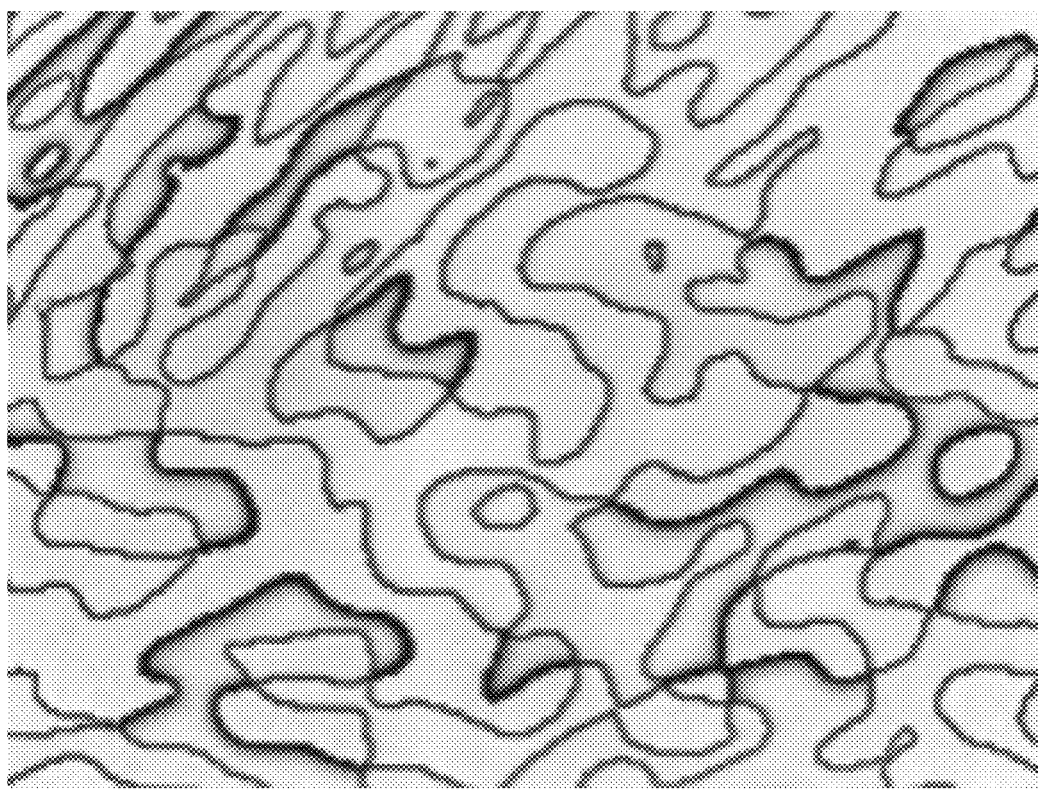
FIG. 36 is a diagram illustrating an example of a black-and-white (gray scale) image acquired from a laser microscope.
Figure 37:
FIG. 37 is a diagram illustrating a result of binarization of a black-and-white image acquired from a laser microscope.

Herein, a method of measuring the area of each level of the DOE by using a laser microscope (VK-X250 manufactured by KEYENCE CORPORATION) will be described. In this laser microscope, although the height measurement accuracy and the repetition accuracy are $3\sigma=12$ nm, the accuracy of several tens of nm is sufficient. FIG. 36 is a diagram illustrating an example of a black-and-white (gray scale) image acquired from the laser microscope. The image obtained from this laser microscope is obtained as a black-and-white image as illustrated in FIG. 36. In addition, an image colored in different colors depending on the height of each stage of the black-and-white image is also obtained (not illustrated). Although it is sufficient to obtain the area for each colored color, usually, even if the height of each stage portion is at the same level, the measured heights are slightly different from each other, so that irregularity (change in chromaticity) occurs in the color. It is not suitable for obtaining the area ratio as it is. Therefore, first, image processing for binarizing the image of FIG. 36 with black and white is performed (FIG. 37). For the binarization, for example, commercially available image processing software can be appropriately used, and the setting of a threshold value may be performed by selecting a value that can best represent characteristics of the microscope image while looking at the processing result. FIG. 37 is a diagram illustrating a result of binarization of a black-and-white image acquired from a laser microscope.

Figure 38:
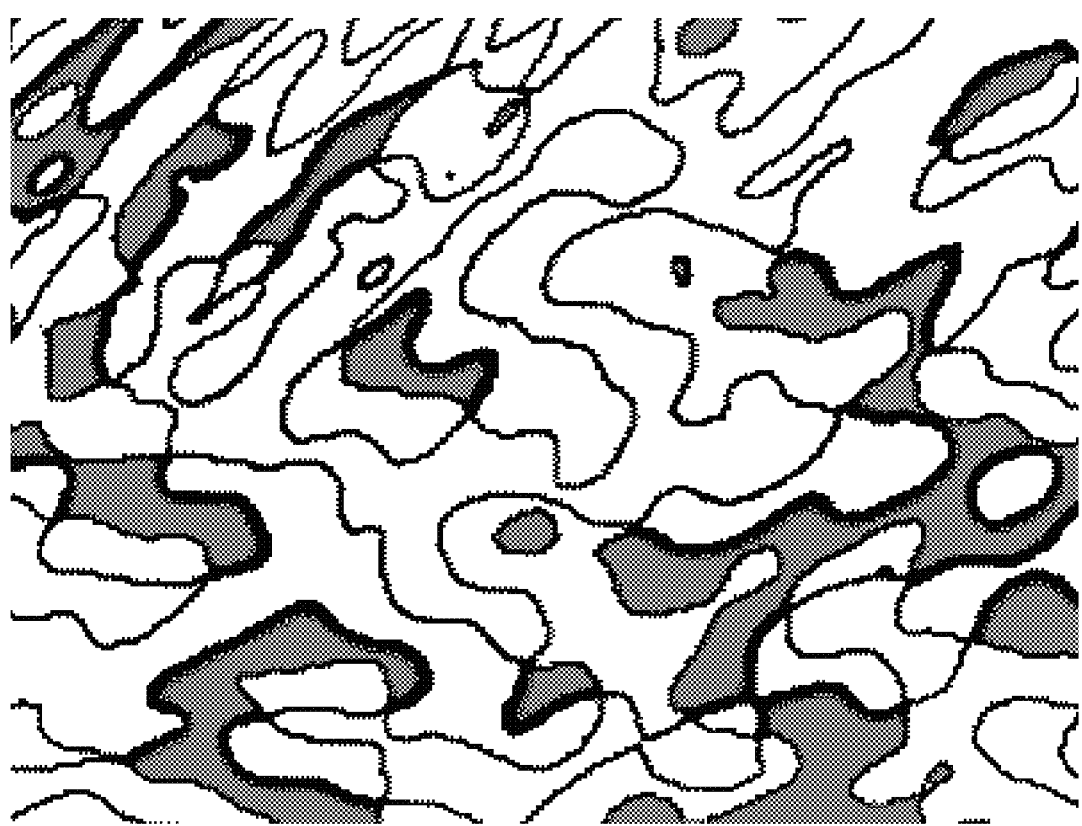
FIG. 38 is a diagram illustrating an example where level-3 is painted.
Figure 39:
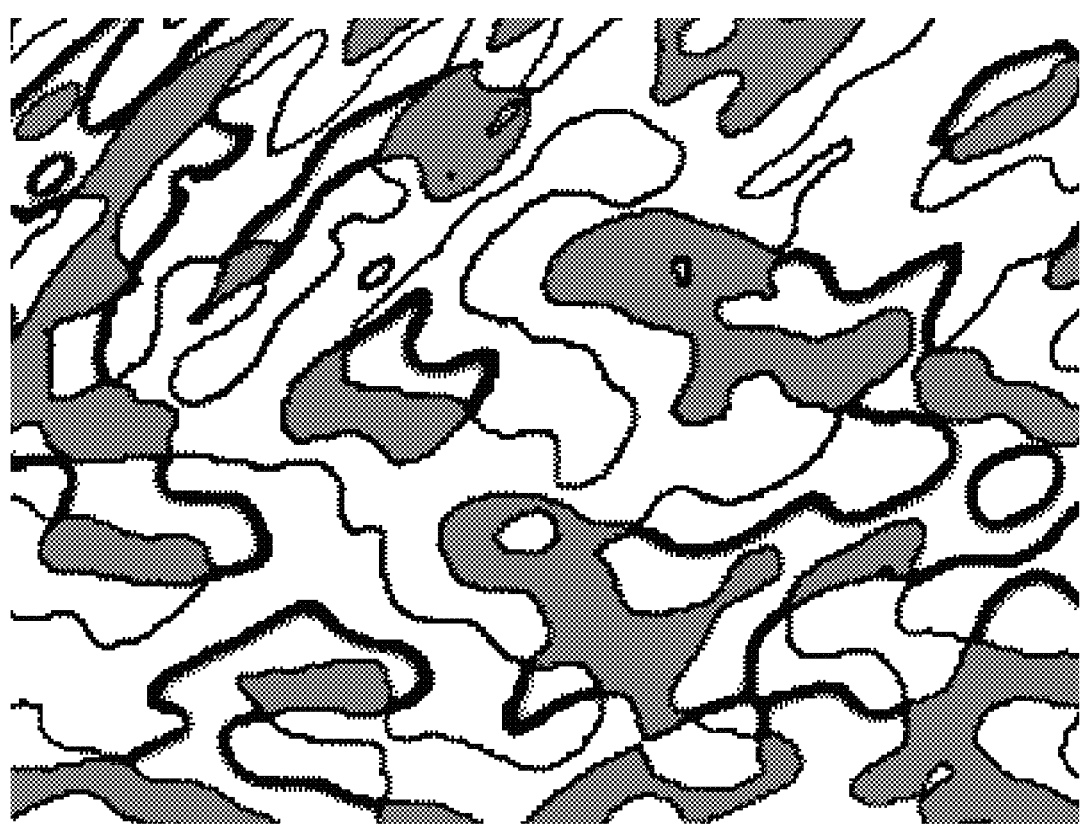
FIG. 39 is a diagram illustrating an example where level-2 is painted.
Figure 40:
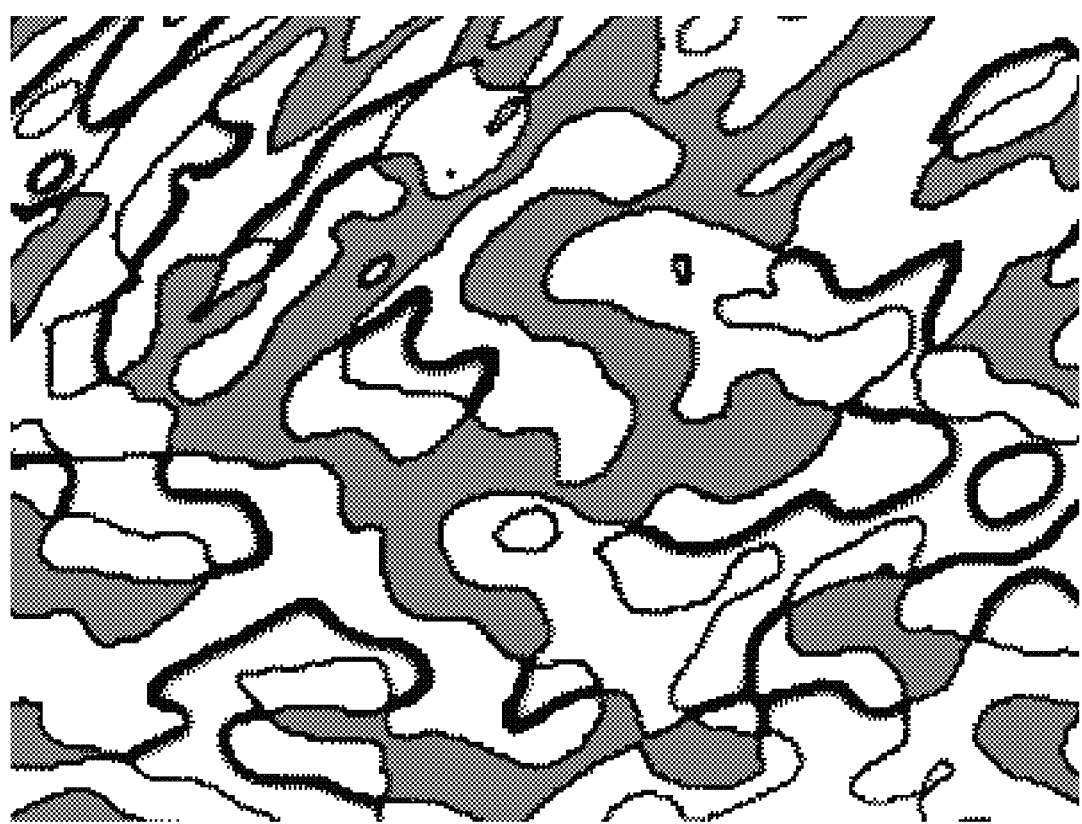
FIG. 40 is a diagram illustrating an example where level-1 is painted.
Figure 41:
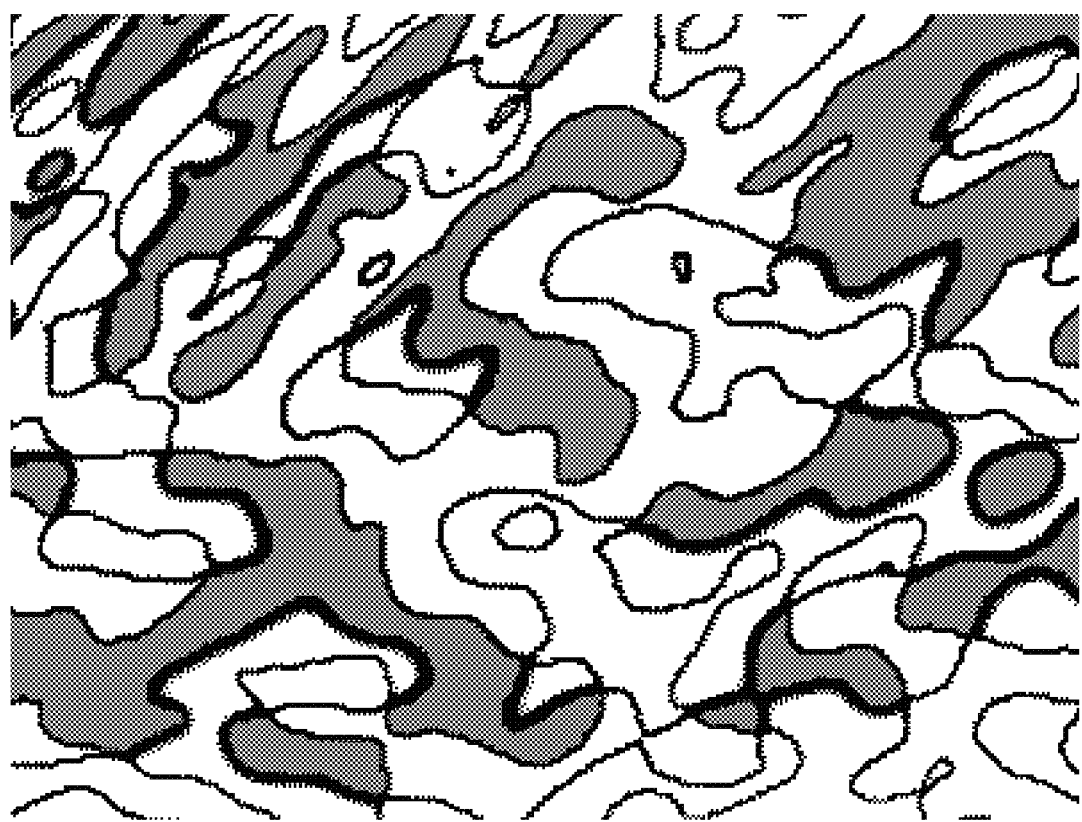
FIG. 41 is a diagram illustrating an example where level-0 is painted.

Next, by using a binarized image, while referring to an image colored in a different color for each height of each stage obtained separately, the white area for each stage is painted with, for example, a half tone color (gray). Also in this painting process, for example, commercially available image processing software can be appropriately used. FIG. 38 is a diagram illustrating an example where level-3 is painted. FIG. 39 is a diagram illustrating an example where level-2 is painted. FIG. 40 is a diagram illustrating an example where level-1 is painted. FIG. 41 is a diagram illustrating an example where level-0 is painted. The painted gray pixels are counted by using the image painted for each stage. Also for the process of counting the number of pixels for each color, for example, commercially available image processing software can be appropriately used. In addition, in the example described above, since the color includes three types of white, black, and gray, the number of gray pixels is counted. For example, in the illustrated example, the count number for the level-3 is 15167, the count number for the level-2 is 24859, the count number for the level-1 is 27541, and the count number for the level-0 is 29391. Since this number corresponds to the area, the area ratio can be obtained. In the image of the microscope output, it is estimated that there is a portion where the boundary of each stage is thick, and the thick portion becomes an inclined plane. In the area measurement method using the image processing described above, by performing the binarization of the image of the microscope output, the inclined plane becomes black not to be included in the calculation of the area ratio, and thus, this inclined plane can be excluded, so that the area calculation is simplified. This point is an advantage of this measurement method.

As described above, according to the present embodiment, the diffractive optical element 10 has an inclined plane having a sawtooth shape having a concave curved plane or a multi-stage shape imitating a concave curved plane, so that the intensity of zeroth-order diffraction light can be greatly reduced. In addition, the reduction of the diffraction efficiency of the first-order light can be suppressed.

(Modified Form)

The present invention is not limited thereto, and various modifications and changes are possible, which are also within the scope of the present invention.

(1) In order to imitate a concave curved plane by a multi-stage shape, the example where only one of the width or height of the multi-stage shape is changed has been described. The present invention is not limited thereto, and for example, both the width and height may be gradually changed.

(2) In the embodiment, the diffractive optical element is illustrated as a simple form configured with only the high refractive index part. The present invention is not limited thereto, and for example, a transparent base material may be provided for forming the high refractive index part, the low refractive index part 14 may be made of a resin, or a covering layer covering the diffraction layer may be provided.

(3) In the embodiment, although the diffractive optical element configured in a multi-stage shape has been mainly described, the present invention is not limited thereto, and for example, the diffractive optical element may be configured in a shape in which the multi-stage shape is finely formed to the limit and cannot be recognized as multi-stage or a continuous inclined plane (curved plane) shape.

In addition, although embodiments and modified forms can also be appropriately combined and used, detailed description is omitted. In addition, the present invention is not limited by the embodiments described above.

EXPLANATION OF REFERENCE NUMERALS

10 DIFFRACTIVE OPTICAL ELEMENT
11 HIGH REFRACTIVE INDEX PART
11a PROJECTION
11a-0 LEVEL-0 STAGE PORTION
11a-1 LEVEL-1 STAGE PORTION
11a-2 LEVEL-2 STAGE PORTION
11a-3 LEVEL-3 STAGE PORTION
11b SIDEWALL PORTION
12 RECESS
13 SPACE
14 LOW REFRACTIVE INDEX PART
15 DIFFRACTION LAYER
200 SCREEN
201 LIGHT
202 IRRADIATION AREA
204 IRRADIATION AREA
210 LIGHT SOURCE UNIT

The invention claimed is:

1. A diffractive optical element shaping light, comprising a diffraction layer including:
   a high refractive index part in which a plurality of projections are arranged side by side; and
   a low refractive index part having a refractive index lower than that of the high refractive index part and including a recess formed at least between the projections, wherein
   the projection has a multi-stage shape formed by a plurality of stage portions having different heights,
   a deepest surface of the high refractive index part has the largest area per unit area, and a surface of a next stage of the uppermost surface of the high refractive index part has the smallest area per unit area, and
   an area of the uppermost surface of the high refractive index part is 0.5 to 0.9 times an area of the lowermost surface of the high refractive index part.

2. The diffractive optical element according to claim 1, wherein the area of each stage portion of the high refractive index part sequentially decreases from the deepest surface toward the surface of the next stage of the uppermost surface per unit area.

3. The diffractive optical element according to claim 1, wherein the high refractive index part forms a diffraction grating having a pattern where a boundary between the projection and the recess includes at least one of a curved line and a polygonal line connecting a plurality of line segments as viewed from a normal direction of a surface on which a concavo-convex shape is formed.

4. The diffractive optical element according to claim 1, wherein the high refractive index part forms a grating cell array type diffraction grating formed in a lattice-like pattern where a plurality of unit cells in which identical concavo-convex shapes are arranged side by side are tiled as viewed from a normal direction of a surface on which the concavo-convex shape is formed.

5. A diffractive optical element shaping light, comprising a diffraction layer including:
   a high refractive index part in which a plurality of projections are arranged side by side in a cross-sectional shape; and
   a low refractive index part having a refractive index lower than that of the high refractive index part and including a recess formed at least between the projections, wherein
   the projection has a sawtooth shape or a shape in which the sawtooth shape is imitated by a multi-stage outline shape,
   an inclined plane inclined with respect to a sheet surface of the diffractive optical element having a sawtooth shape or a sawtooth shape imitated by a multi-stage outline shape has a concave curved plane which is concave toward the projection, and
   an area of the uppermost surface of the high refractive index part is 0.5 to 0.9 times an area of the lowermost surface of the high refractive index part.

6. The diffractive optical element according to claim 5, wherein the projection has a multi-stage shape imitating the sawtooth shape by a plurality of stage portions having different heights on at least one side of a side surface shape, and wherein the concave curved plane is imitated by changing at least one of the height and width of the stage portion according to a location.

7. The diffractive optical element according to claim 6, wherein the height per stage of the stage portion is constant, and
wherein the concave curved plane is imitated by changing the width of the stage portion according to a location.

8. The diffractive optical element according to claim 7, wherein, when a direction in which the projections are arranged is an x axis, and a direction in which the inclined plane is elevated is a positive direction of the x axis,
a y axis is perpendicular to the sheet surface of the diffractive optical element, and a projecting direction of the projection is a positive direction of the y axis,
the total number of stages of the stage portions counted including a distal end of the projections is L,
a rate of decrease in width at each level is f,
the number of stages of a target stage portion by setting a lowest position of the recess to 0 is lv,
a height of the stage portion per stage is a constant value of h, and
a width ratio of level zero is C,
a width of the highest level is tw,
a pitch is P,
a curved line which is a locus configured with a concave vertex of level zero and a vertex of each projection in a cross section of the concave curved plane imitated by a multi-stage shape is expressed by the following formulas,
when the ratio of the x coordinate to a pitch is S and the following are defined as:

$x' = 0.5 \times f \times lv^2 + C \times lv;$ $S = P/\{tw + \Sigma x'i\};$ and $\Sigma$ is performed over i=0 to L−1,
the x and y coordinates of the vertexes of the step shape are expressed as $x = 0.5 \times f \times lv^2 + C \times lv$ $y = lv \times h.$ 9. The diffractive optical element according to claim 5, wherein the projection has a multi-stage shape imitating the sawtooth shape by a plurality of stage portions having different heights on at least one side of a side surface shape, and
wherein the deepest surface has the largest area per unit area, and the surface of the next stage of the uppermost surface has the smallest area per unit area.

10. A diffractive optical element shaping light, comprising a diffraction layer including:
a high refractive index part in which a plurality of projections are arranged side by side in a cross-sectional shape; and
a low refractive index part having a refractive index lower than that of the high refractive index part and including a recess formed at least between the projections, wherein
the projection has a sawtooth shape or a shape in which the sawtooth shape is imitated by a multi-stage outline shape,
an inclined plane inclined with respect to a sheet surface of the diffractive optical element having a sawtooth shape or a sawtooth shape imitated by a multi-stage outline shape has a concave curved plane which is concave toward the projection,
the projection has a multi-stage shape imitating the sawtooth shape by a plurality of stage portions having different heights on at least one side of a side surface shape,
the concave curved plane is imitated by changing at least one of the height and width of the stage portion according to a location,
the height per stage of the stage portion is constant,
the concave curved plane is imitated by changing the width of the stage portion according to a location,
when a direction in which the projections are arranged is an x axis, and a direction in which the inclined plane is elevated is a positive direction of the x axis,
a y axis is perpendicular to the sheet surface of the diffractive optical element, and a projecting direction of the projection is a positive direction of the y axis,
the total number of stages of the stage portions counted including a distal end of the projections is L,
a rate of decrease in width at each level is f,
the number of stages of a target stage portion by setting a lowest position of the recess to 0 is lv,
a height of the stage portion per stage is a constant value of h, and
a width ratio of level zero is C,
a width of the highest level is tw,
a pitch is P,
a curved line which is a locus configured with a concave vertex of level zero and a vertex of each projection in a cross section of the concave curved plane imitated by a multi-stage shape is expressed by the following formulas,
when the ratio of the x coordinate to a pitch is S and the following are defined as:

$x' = 0.5 \times f \times lv^2 + C \times lv;$ $S = P/\{tw + \Sigma x'i\};$ $\Sigma$ is performed over i=0 to L−1,
the x and y coordinates of the vertexes of the step shape are expressed as $x = 0.5 \times f \times lv^2 + C \times lv$ $y = lv \times h.$

* * * * *